US011827299B2

(12) United States Patent
Gilmore et al.

(10) Patent No.: US 11,827,299 B2
(45) Date of Patent: Nov. 28, 2023

(54) BICYCLE SADDLE WITH SPRING-BASED VIBRATION ISOLATION

(71) Applicant: Toyota Motor Engineering & Manufacturing North America, Inc., Plano, TX (US)

(72) Inventors: Paul A. Gilmore, Ann Arbor, MI (US); Christian Arthur Trager, Canton, MI (US); Umesh N. Gandhi, Farmington Hills, MI (US); Ryohei Tsuruta, Ann Arbor, MI (US); Michael Paul Rowe, Pinckney, MI (US)

(73) Assignee: Toyota Motor Engineering & Manufacturing North America, inc., Plano, TX (US)

( * ) Notice: Subject to any disclaimer, the term of this patent is extended or adjusted under 35 U.S.C. 154(b) by 0 days.

(21) Appl. No.: 18/161,611

(22) Filed: Jan. 30, 2023

(65) Prior Publication Data
US 2023/0219646 A1    Jul. 13, 2023

Related U.S. Application Data

(63) Continuation-in-part of application No. 17/571,969, filed on Jan. 10, 2022, now Pat. No. 11,565,763.

(51) Int. Cl.
*B62J 1/06*    (2006.01)

(52) U.S. Cl.
CPC ..................... *B62J 1/065* (2013.01)

(58) Field of Classification Search
CPC .. F16F 1/32; F16F 2228/063; F16F 2228/066; F16F 15/005; B62J 1/02; B62J 1/065; B62J 1/045
See application file for complete search history.

(56) References Cited

U.S. PATENT DOCUMENTS 3,856,242 A * 12/1974 Cook ..................... F16F 15/06
                                                    248/548
5,301,974 A * 4/1994 Knapp ................... B62K 25/30
                                                    267/221

(Continued)

FOREIGN PATENT DOCUMENTS

CN          105408192 A      3/2016

OTHER PUBLICATIONS

International Search Report and Written Opinion for International Application No. PCT/US2023/010404, dated May 3, 2023 (11 pages).

*Primary Examiner* — Sarah B Mcpartlin
(74) *Attorney, Agent, or Firm* — Christopher G. Darrow; Darrow Mustafa PC

(57) ABSTRACT

A vibration isolator cartridge can be configured to exhibit a non-linear stiffness profile. The non-linear stiffness profile including a region of quasi-zero stiffness. The vibration isolator cartridge can include a housing. The vibration isolator cartridge can include a plunger. The plunger can be configured to be depressed toward a distal end portion of the housing. The vibration isolator cartridge can include a plurality of spring members operatively positioned within the housing between the plunger and the distal end portion of the housing. The plurality of spring elements can be arranged in a stack. The vibration isolator cartridge can be used to provide improved vibration isolation performance in various applications, such as a bicycle saddle.

20 Claims, 19 Drawing Sheets

(56) References Cited

U.S. PATENT DOCUMENTS

| | | | | |
|---|---|---|---|---|
| 7,854,425 B2* | 12/2010 | Evans | ............... | F16F 3/02 |
| | | | | 267/162 |
| 8,500,108 B2* | 8/2013 | Rode | ............... | F16F 1/32 |
| | | | | 267/260 |
| 9,957,007 B2 | 5/2018 | Bigolin | | |
| 2019/0186588 A1* | 6/2019 | Gandhi | ............... | F16F 3/02 |
| 2020/0393013 A1* | 12/2020 | Schneider | ............ | F16F 15/06 |

* cited by examiner

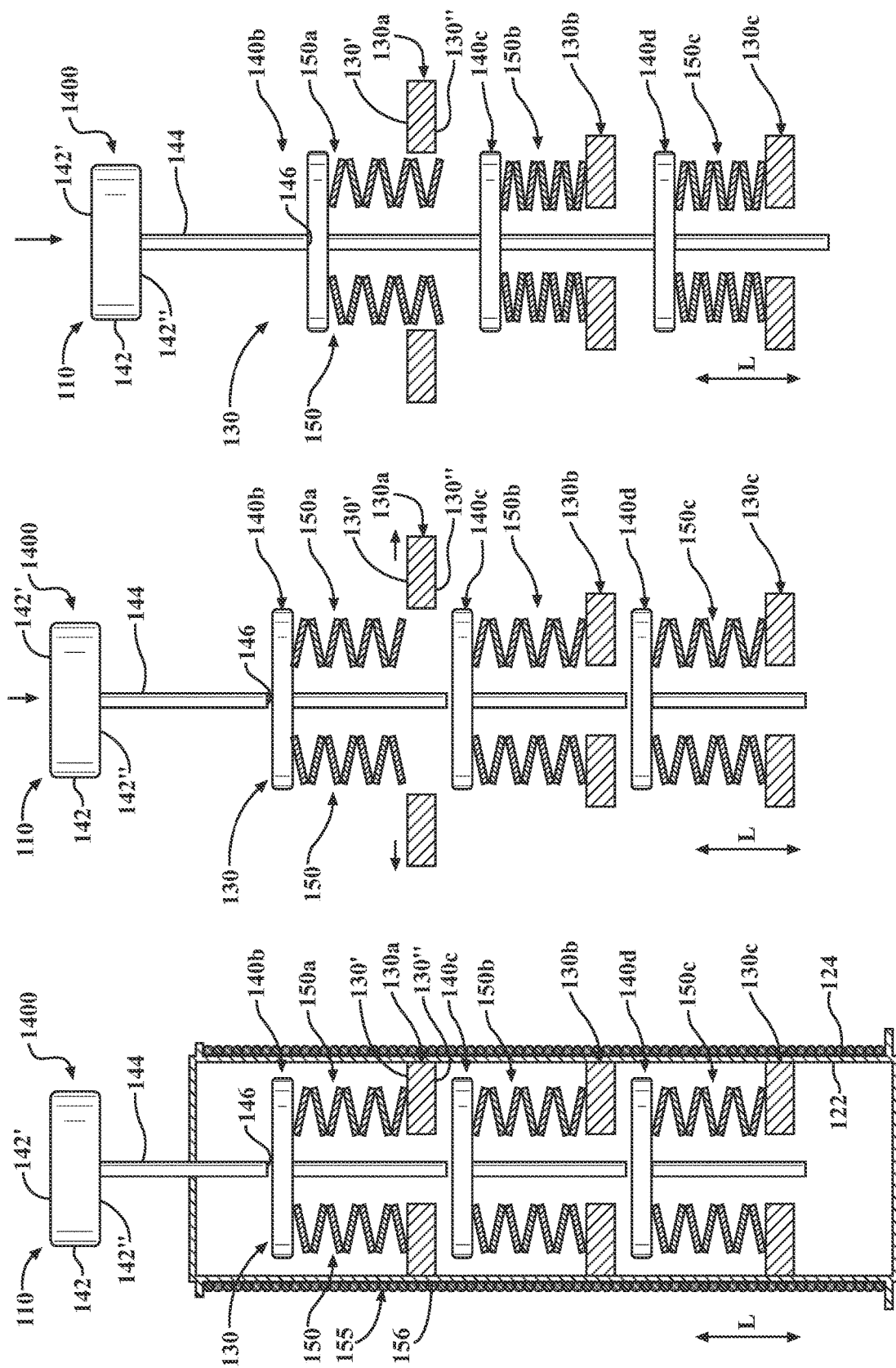

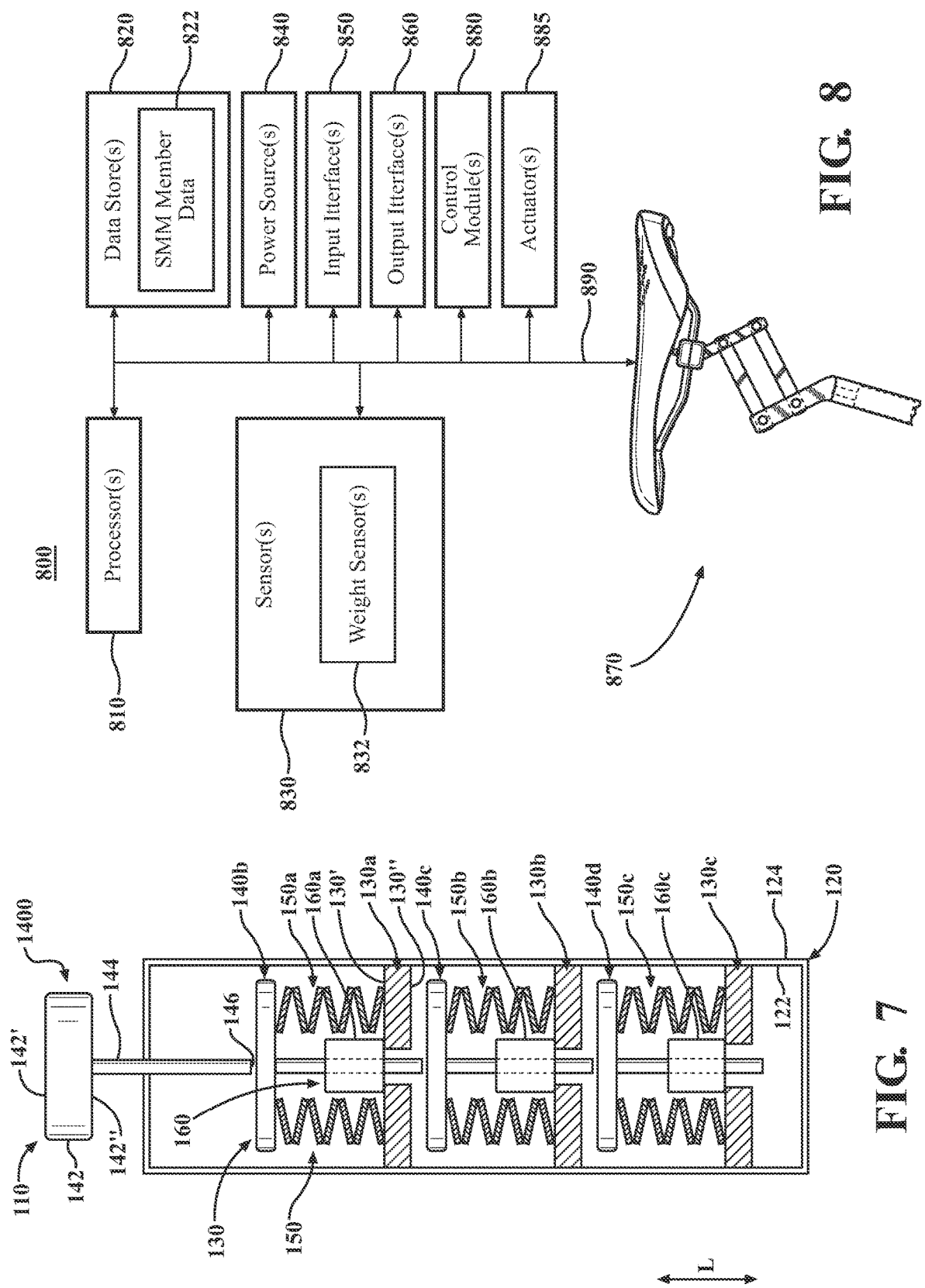

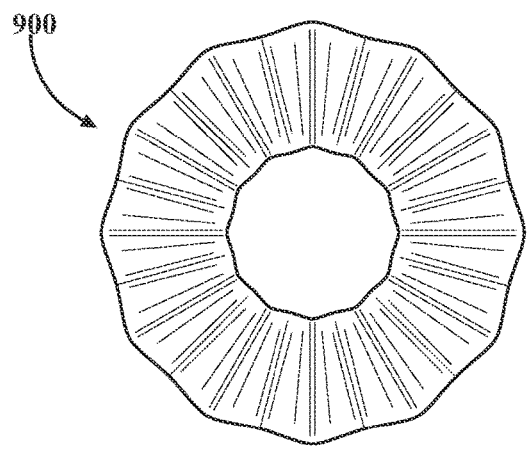
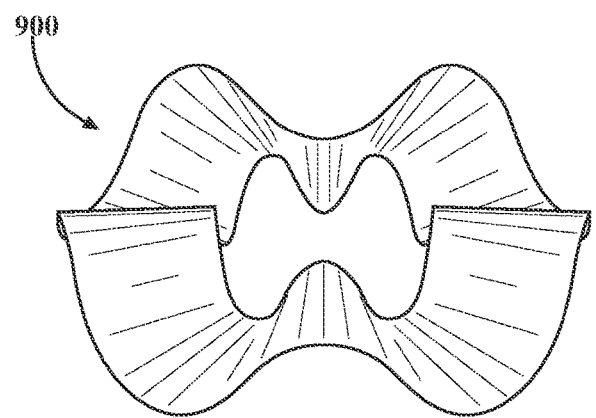
FIG. 9A    FIG. 9B
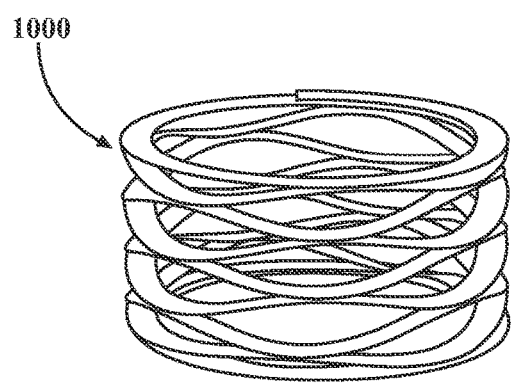
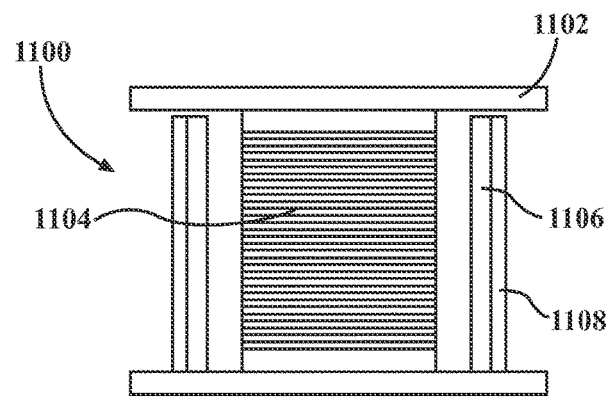
FIG. 10    FIG. 11
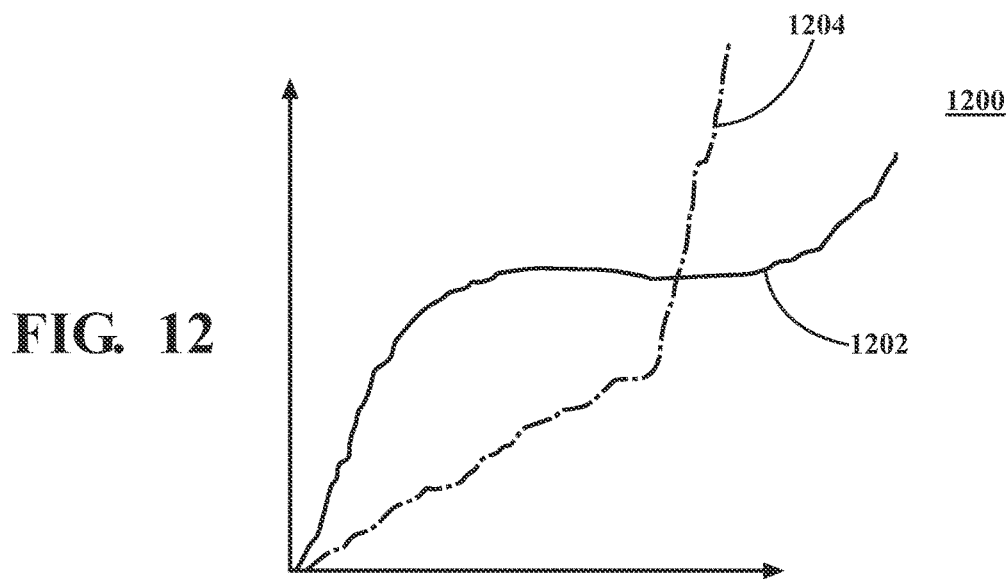
FIG. 12

BICYCLE SADDLE WITH SPRING-BASED VIBRATION ISOLATION

CROSS-REFERENCE TO RELATED APPLICATIONS

This application is a continuation-in-part of U.S. patent application Ser. No. 17/571,969, filed on Jan. 10, 2022, which is incorporated herein by reference in its entirety.

FIELD

The subject matter described herein relates in general to saddles and, more particularly, to bicycle saddles.

BACKGROUND

A bicycle saddle, typically referred to as a bicycle seat, is designed to support a portion of a rider's body. The height of the saddle is often adjustable. The saddle can be made in various shapes and sizes. The saddle can be configured to provide some amount comfort for the rider, such as by including padding.

SUMMARY

In one respect, the present disclosure is directed to a vibration isolator cartridge. The vibration isolator cartridge can include a housing. The vibration isolator cartridge can include a plunger. The plunger can be configured to be depressed toward a distal end portion of the housing. The vibration isolator cartridge can include a plurality of spring members operatively positioned within the housing between the plunger and the distal end portion of the housing. The plurality of spring elements can be arranged in a stack. The vibration isolator cartridge can be configured to exhibit a non-linear stiffness profile. The non-linear stiffness profile can include a region of quasi-zero stiffness.

In another respect, the present disclosure is directed to a vibration isolation system. The vibration isolation system can include a plurality of vibration isolator cartridges. The plurality of vibration isolator cartridges can be arranged in an end-to-end manner. Each of the plurality of vibration isolator cartridges can include a housing and a plurality of conical springs operatively positioned within the housing. The plurality of conical springs can be arranged in a stack. Each of the plurality of vibration isolator cartridges can be configured to exhibit a non-linear stiffness profile. The non-linear stiffness profile can include a region of quasi-zero stiffness. The plurality of vibration isolator cartridges can be configured to act in parallel with each other.

In still another respect, the present disclosure is directed to a system for vibration isolation of a bicycle saddle. The system can include a bicycle saddle and a bicycle frame. The bicycle saddle can be operatively connected to the bicycle frame. The system can include a plurality of vibration isolator cartridges. The plurality of vibration isolator cartridges can be located within a portion of the bicycle frame. The plurality of vibration isolator cartridges can be operatively positioned with respect to the bicycle saddle. Each of the vibration isolator cartridges can include a plurality of conical springs arranged in a stack. Each of the plurality of vibration isolator cartridges can be configured to exhibit a non-linear stiffness profile. The non-linear stiffness profile can include a region of quasi-zero stiffness.

BRIEF DESCRIPTION OF THE DRAWINGS

FIG. 5 is a cross-sectional view of a second example of an isolator for a bicycle saddle, showing a non-activated state.

FIG. 6A is a cross-sectional view of a third example of an isolator for a bicycle saddle, showing a non-activated state.

FIG. 6B is a cross-sectional view of the third example of an isolator for a bicycle saddle, showing an activated state.

FIG. 7 is a cross-sectional view of a fourth example of an isolator for a bicycle saddle, showing a non-activated state.

FIG. 8 is an example of a vibration isolation system.

FIGS. 9A-9B are views of an example of an annular wave spring.

FIG. 10 is an example of a multi-turn wave spring.

FIG. 11 is an example of a magnetic elastomer isolator.

FIG. 12 is an example of a force versus deflection graph, showing the difference in curves for spring-based vibration isolators and linear springs.

DETAILED DESCRIPTION

Figure 1:
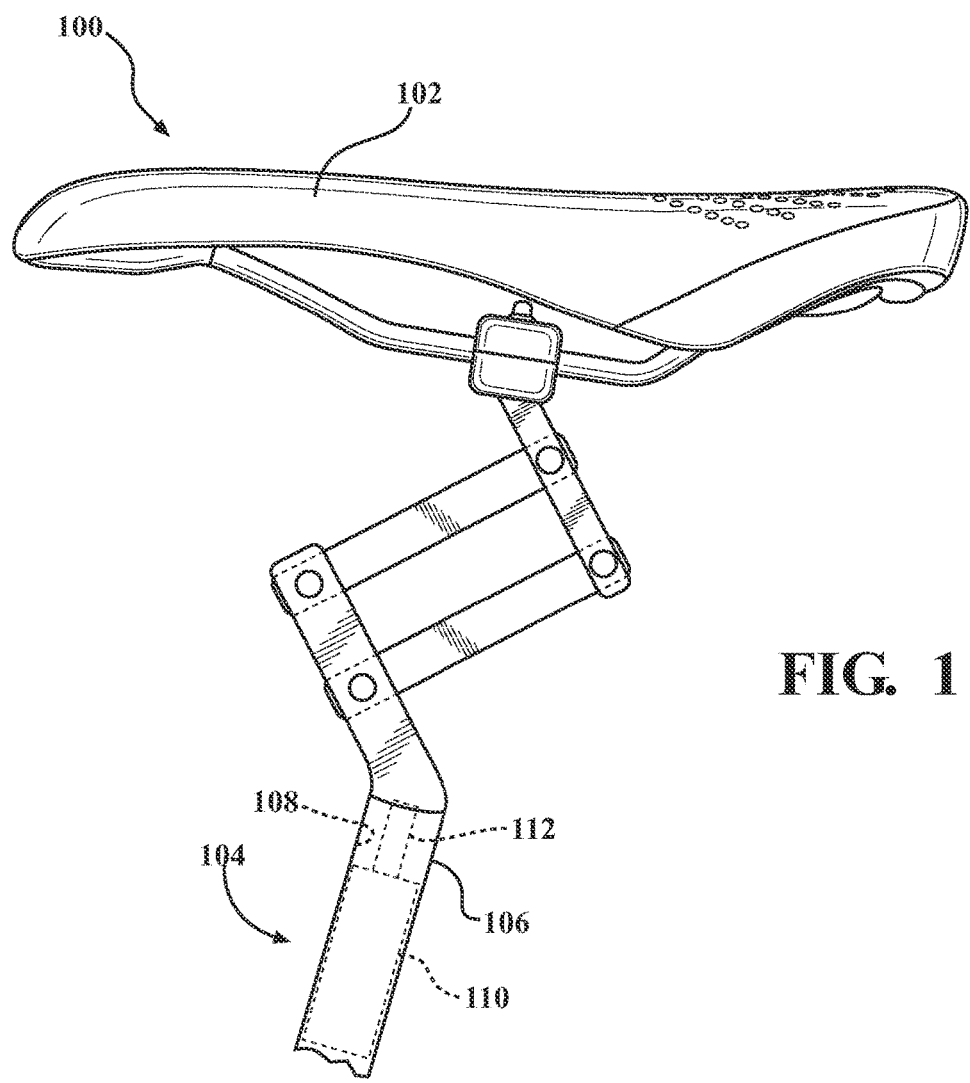
FIG. 1 is an example of a portion of a bicycle.

When in use, a bicycle may be driven over rough or otherwise non-smooth surfaces. As a result, vibrations may be transmitted to the bicycle seat or saddle. These vibrations can cause rider discomfort and/or reduce ride quality. According to arrangements described herein, a vibration isolator and a system can be configured to manage vibrations and/or forces that may be encountered during bicycle use.

A vibration isolator can be configured to exhibit a non-linear stiffness profile. The non-linear stiffness profile can include a region of quasi-zero stiffness. The vibration isolator can include a plurality of spring members arranged in a stack. The vibration isolator can be used in connection with a system. In such case, the vibration isolator can be located within a portion of a bicycle frame. The vibration isolator can be operatively positioned with respect to the bicycle saddle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-24, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a portion of a bicycle 100 is shown. While arrangements described herein will be made with respect to a bicycle, it will be understood that arrangements described herein can be used in connection with various devices that include a seat or saddle. For instance, arrangements described herein can be used in connection with any powered or non-powered vehicle, including, for example, a unicycle, a motorcycle, or a tricycle.

The bicycle 100 can include a saddle 102, which may also be referred to as a seat. The saddle 102 can be designed to support a portion of a rider's body. The saddle 102 can provide cushioning and/or comfort to a user. The saddle 102 can be any type of saddle, now known or later developed.

The saddle 102 can be operatively connected to a frame 104 of the bicycle in any suitable manner, now known or later developed. In one or more arrangements, the saddle 102 can be operatively connected to a seat post 106. The seat post 106 can be a tubular structure. In some arrangements, at least a portion of the seat post 106 can be hollow. In such case, the seat post 106 can have an inner peripheral surface 108. The term "operatively connected," as used throughout this description, can include direct or indirect connections, including connections without direct physical contact.

A vibration isolator 110 can be operatively positioned to reduce vibrations acting upon the saddle 102. The vibration isolator 110 can be provided in any suitable location. In one or more arrangements, the vibration isolator 110 can be located within the hollow interior of the seat post 106. In some arrangements, the vibration isolator 110 can frictionally engage the inner peripheral surface 108 of the seat post 106. In some arrangements, the vibration isolator 110 can be operatively connected to the seat post 106. For instance, the vibration isolator 110 can be operatively connected to the seat post 106 by one or more fasteners, one or more welds, one or more adhesives, and/or one or more forms of mechanical engagement, or any combination thereof. The vibration isolator 110 can be operatively positioned with respect to an engaging structure, such as a pin 112, of the saddle 102 or other structure operatively connected to the saddle 102. In some arrangements, the pin 112 can directly contact the vibration isolator 110. In some arrangements, the pin 112 can be spaced from the vibration isolator 110.

In use, the structure above the pin 112 in FIG. 1 (e.g., a four-bar linkage or other structure) can push downwardly on the pin 112. As a result, the pin can push downwardly on the vibration isolator 110. In some arrangements, the structure and the pin 112 can be separate structures. In other arrangements, the structure and the pin 112 can be operatively connected to each other or can be a unitary structure.

It should be noted that, while the arrangements shown in FIG. 1 include a single vibration isolator 110, it will be appreciated that there can be a plurality of vibration isolators 110. In such case, the plurality of vibration isolators 110 can be arranged in any suitable manner. For instance, the plurality of vibration isolators 110 can be stacked end to end within the seat post 106. When there is a plurality of vibration isolators 110, the vibration isolators 110 can be substantially identical to each other, or one or more of the vibration isolators 110 can be different from the other vibration isolators 110 in one or more respects.

Figure 2A:
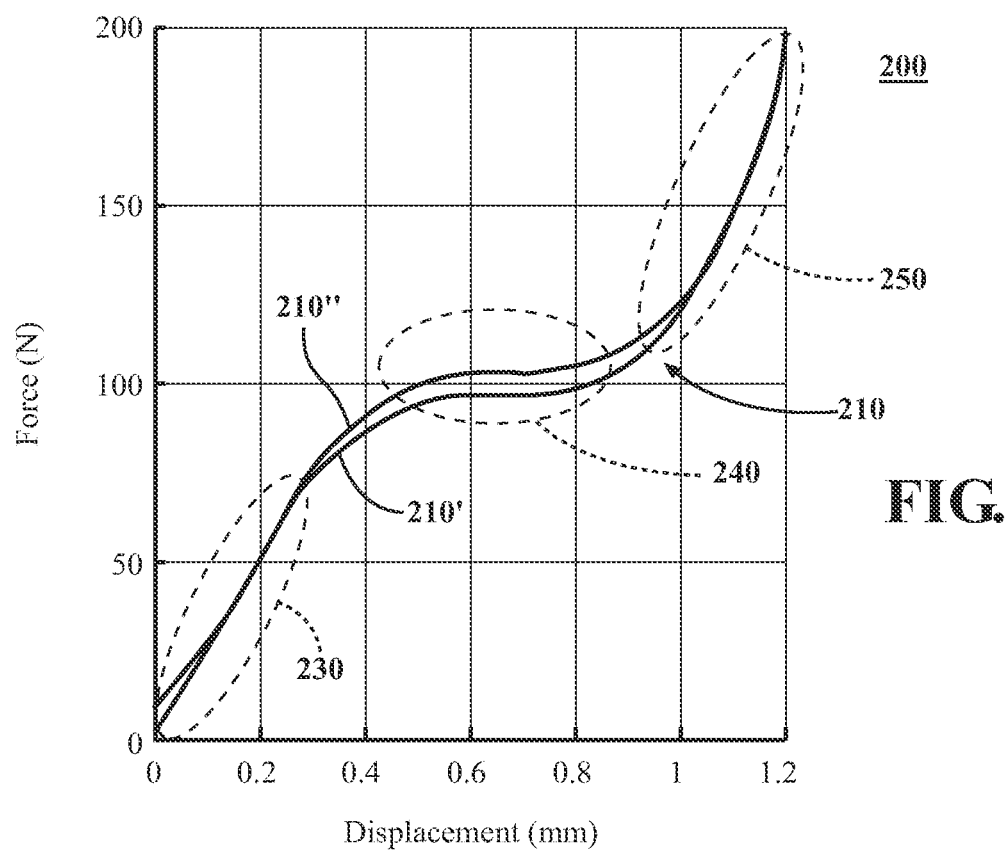
FIG. 2A is an example of a force-deflection curve of a conical spring.

The vibration isolator 110 can be configured to exhibit a non-linear stiffness profile. The non-linear stiffness profile can include a region of quasi-zero stiffness. An example of a force-deflection graph 200 for this type of actuator is shown in FIG. 2A. It is noted that this force-deflection graph 200 is merely an example, as the values will vary depending on various characteristics of the isolator. However, the general shape of a force-deflection curve 210, representing the stiffness profile, is shown. Starting from the origin 220, the vibration isolator 110 can exhibit an initial stiffness region 230 that is substantially linear. The vibration isolator 110 is relatively stiff in the initial stiffness region 230. When load is reached, the force-deflection curve 210 can become zero or substantially zero, which is a quasi-zero stiffness region 240. The quasi-zero stiffness region 240 can allow for good vibration isolation. Continuing beyond the quasi-zero stiffness region 240, the force-deflection curve 210 can have a subsequent stiffness region 250 that is substantially linear. The vibration isolator 110 is relatively stiff in the subsequent stiffness region 250.

It should be noted that there are two force-deflection curves shown in FIG. 2A. A first force-deflection curve 210' represents the vibration isolator 110 going from a non-loaded state to a loaded state. A second force deflection curve 210" represents the vibration isolator 110 going from a loaded state to a non-loaded state.

Figure 2B:
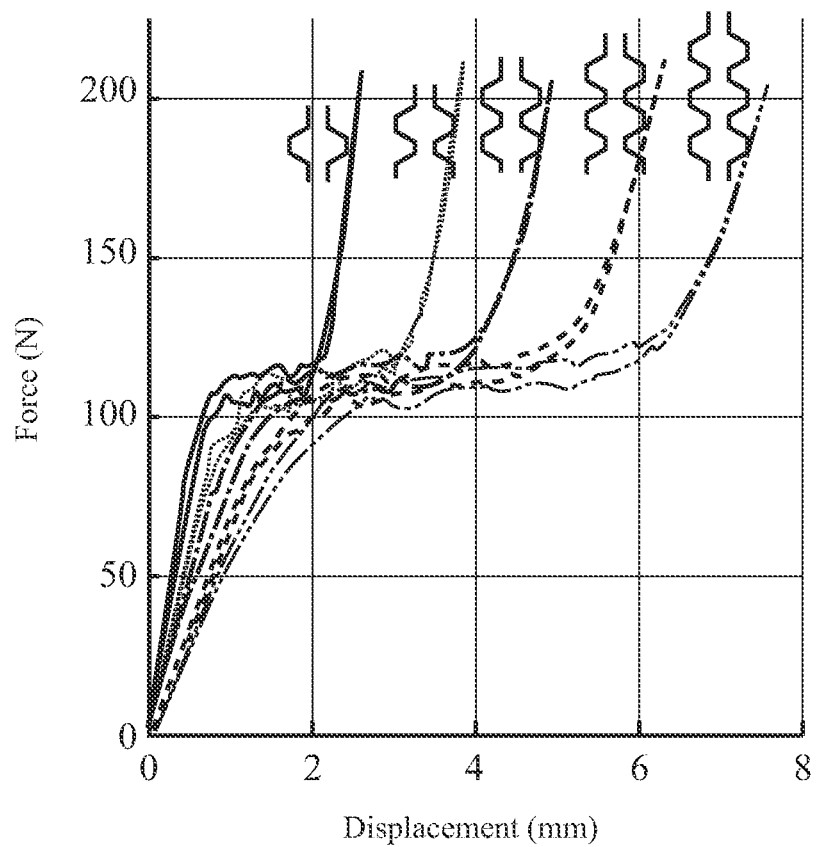
FIG. 2B is an example of the force-deflection curve for various stacks of a plurality of conical springs.

According to arrangements herein, the vibration isolator 110 can include a plurality of spring members. In one or more arrangements, the spring members can be conical springs 300. It should be noted that other terms can be used to describe the conical springs 300 such as Belleville washes, disk springs, conical disks, etc. As more conical springs are added to the stack, the quasi-zero stiffness region 240 of the force-deflection curve 210 can be extended. An example of a force-deflection graph 260 depicting this effect is shown in FIG. 2B. As is evident, the length of the quasi-zero stiffness region increases as the number of conical springs 300 used in the stack increases.

Figure 3:
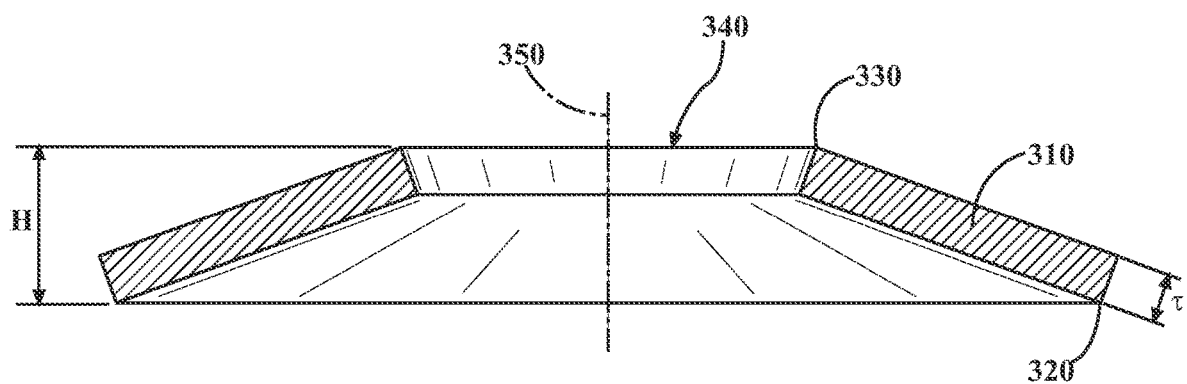
FIG. 3 is a cross-sectional view of an example of a conical spring used in an isolator for the bicycle saddle.

Referring to FIG. 3, an example of a conical spring 300 is shown. The conical spring 300 can have a body 310 with a substantially conical shape. The conical spring 300 can include an outer diameter body portion 320 and an inner diameter body portion 330. The outer diameter body portion 320 can be larger than the inner diameter body portion 330. The conical spring 300 can have a central aperture 340. The conical spring 300 can have a central axis 350. The conical spring can have a height H and a thickness $\tau$.

A plurality of the conical springs 300 can be arranged in any suitable manner in a stack. For instance, in one or more arrangements, the plurality of the conical springs 300 can be arranged in an alternating pattern. For example, the outer diameter body portion 320 of one conical spring 300 can face the outer diameter body portion 320 of a neighboring conical spring 300. Alternatively or additionally, the inner diameter body portion 330 of a conical spring 300 can face the inner diameter body portion 330 of a neighboring conical spring 300. The central apertures 340 of the conical springs 300 can be substantially aligned with each other.

There are numerous ways in which the plurality of conical springs 300 can be arranged in a stack. Some examples will be described herein, but it will be understood that arrangements are not limited to these examples.

The vibration isolator 110 can have various configurations, some of which will be described herein in connection with FIGS. 4-7. Each of these configurations will be described in turn below.

Figure 4C:
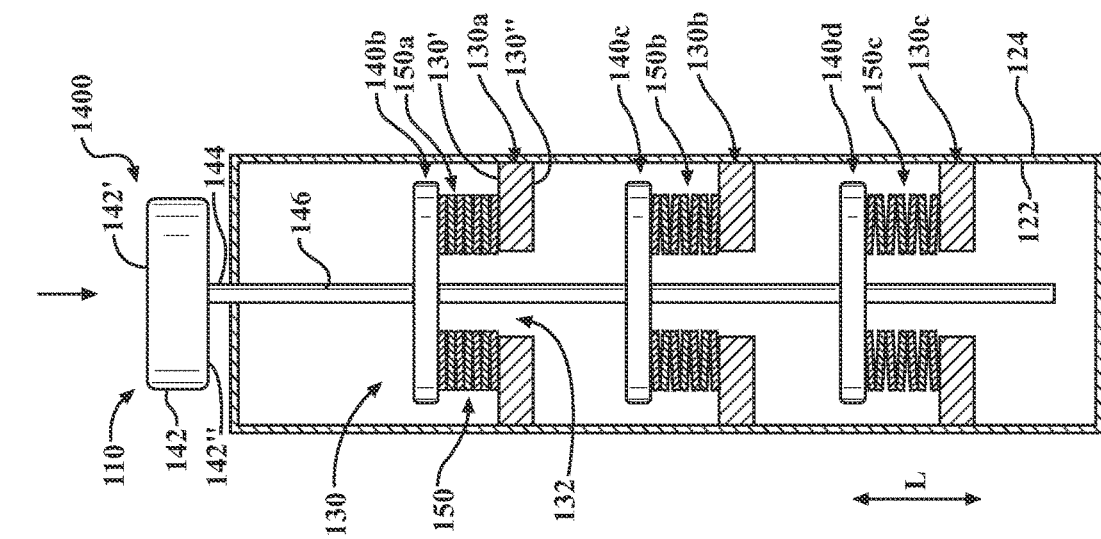
FIG. 4C is a cross-sectional view of the first example of an isolator for a bicycle saddle, showing a further activated state.
Figure 4B:
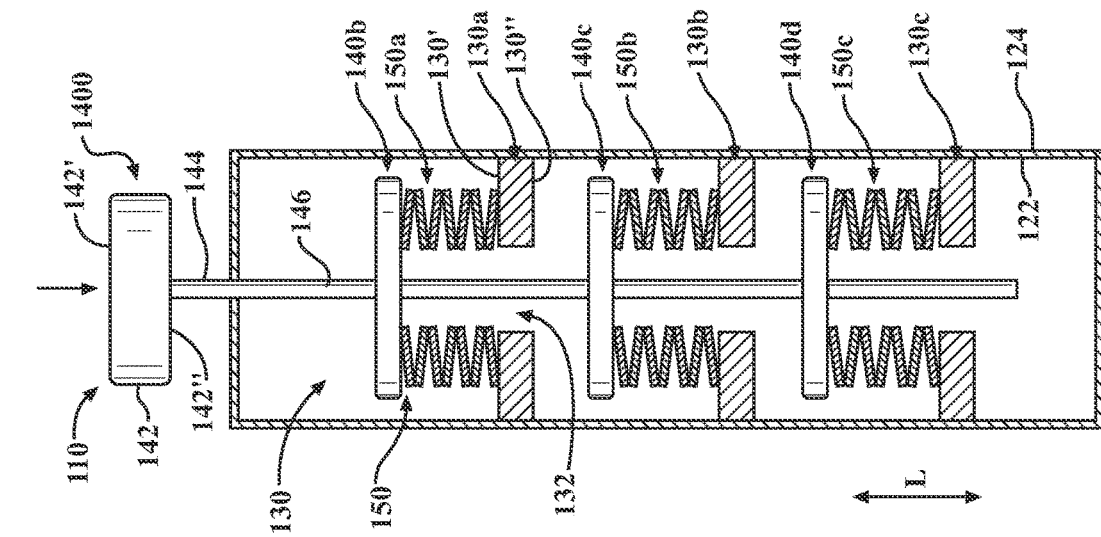
FIG. 4B is a cross-sectional view of the first example of an isolator for a bicycle saddle, showing an activated state.
Figure 4A:
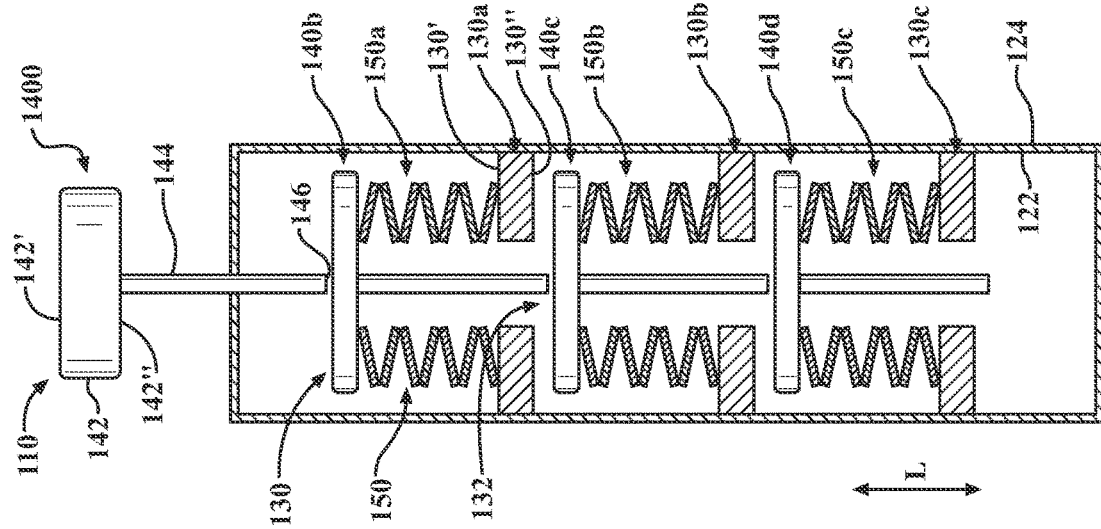
FIG. 4A is a cross-sectional view of a first example of an isolator for a bicycle saddle, showing a non-activated state.

Referring to FIGS. 4A-4B, a first example of the vibration isolator 110 is shown. The vibration isolator 110 can include an outer housing 120. The outer housing 120 can have any suitable size, shape, and/or configuration. In one or more arrangements, the outer housing 120 can be substantially cylindrical. The outer housing 120 can be hollow. The outer housing 120 can have an inner peripheral surface 122 and an outer peripheral surface 124. The outer housing 120 can be made of any suitable material, including, for example, metals or plastics.

The vibration isolator 110 can include one or more landings 130. The landings 130 can be operatively connected to the outer housing 120. For example, the landings 130 can be operatively connected to the inner peripheral surface 122 of outer housing 120 by one or more fasteners, one or more welds, one or more adhesives, and/or one or more forms of mechanical engagement, or any combination thereof. The landings 130 can be fixed landings in that they do not move. In some arrangements, the landings 130 can be fixed landings at least in that they do not move at least in the longitudinal direction L of the vibration isolator 110.

The landings 130 can have any suitable form. For instance, in one or more arrangements, the landings 130 can be substantially cylindrical in conformation. In some arrangements, one or more of the landings 130. Alternatively, one or more of the landings 130 can be made of a plurality of segments. The landings can define a central aperture 132.

The landings 130 can have an upper side 130' and a lower side 130". It will be appreciated that the terms "upper" and "lower" are made with respect to the orientation of the vibration isolator 110 in FIGS. 4A-4B. However, it will be understood that these terms are used for convenience to facilitate the discussion and are not intended to be limiting.

The landings 130 can be substantially identical to each other. Alternatively, one or more of the landings 130 can be different from the other landings in one or more respects. The landings 130 can be substantially equally spaced from each other. Alternatively, one or more of the landings 130 may be non-equally spaced. The landings 130 can be made of any suitable material, including, for example, metals or plastics.

The vibration isolator 110 can include any suitable number of landings 130. In the arrangements shown in FIGS. 4A-4B, there can be three landings. However, it will be appreciated that there can be a greater or fewer number of landings. To facilitate the discussion, the uppermost landing in FIG. 4A will be referred to as the first landing 130a. Continuing downwardly in the longitudinal direction L, the next landing will be referred to as the second landing 130b. The lowermost landing will be referred to as the third landing 130c.

The vibration isolator 110 can include a plurality of plungers 140. The plungers 140 can be any movable structure and can have any suitable configuration. For instance, in one or more arrangements, one or more of the plungers 140 can include a head 142 and a shaft 144. The head 142 can include an upper side 142' and a lower side 142". The shaft 144 can extend from the head 142 and, more particularly, from the lower side 142" of the head 142. The shaft 144 can extend to a distal end 146.

The vibration isolator 110 can include any suitable number of plungers 140. In the arrangements shown in FIGS. 4A-4B, there can be four plungers. However, it will be appreciated that, in some arrangements, there can be a greater or fewer number of plungers. To facilitate the discussion, the uppermost plunger in FIG. 4A will be referred to as the first plunger 140a. Continuing downwardly in the longitudinal direction L, the next plunger will be referred to as the second plunger 140b. Continuing further downwardly in the longitudinal direction L, the next plunger will be referred to as the third plunger 140c. The lowermost plunger will be referred to as the fourth plunger 140d.

The head 142 can have any suitable size, shape, and/or configuration. The shafts 144 can have any suitable size, shape, and/or configuration. The head 142 and the shaft 144 can be a unitary structure, or they can be separate pieces subsequently joined together. In some arrangements, the head 142 can be substantially circular, rectangular, polygonal, or triangular in conformation. In some arrangements, the shaft 144 can have a substantially circular, rectangular, polygonal, or triangular cross-sectional shape.

In some arrangements, the shafts 144 of the plungers 140 can be substantially aligned with each other within the vibration isolator 110. In some arrangements, one or more of the shafts 144 can be offset from the other shafts 144.

The plungers 140 can be substantially identical to each other. Alternatively, one or more of the plungers 140 can be different from the other plungers 140 in one or more respects, including, for example, head width, head shape, head thickness, shaft length, shaft diameter or width, and/or shaft cross-sectional shape. In some arrangements, the head 142 and a portion of the shaft 144 of the first plunger 140*a* can extend outside of the outer housing 120. This exposed portion of the first plunger 140*a* can engage with the engaging structure (e.g., the pin 112 in FIG. 1). The plungers 140 can be made of any suitable material, including, for example, metals or plastics.

As noted above, the vibration isolator 110 can include a plurality of spring members, such as conical springs 150. The conical springs 150 can be any suitable conical spring, now known or later developed. The spring members can be any suitable type of spring member, now known or later developed.

The conical springs 150 can be arranged in any suitable manner. For instance, a plurality of conical springs 150 can be arranged in a stack. The conical springs can be arranged in any suitable manner in the stack. For instance, the plurality of conical springs 150 can be arranged in an alternating pattern, as described above in connection with FIG. 3 and as shown in FIGS. 4A-4C.

A first stack of conical springs 150*a* can be operatively connected to and/or operatively positioned with respect to the second plunger 140*b* (e.g., the lower side 142" of the head 142 of the second plunger 140*b*) and the first landing 130*a* (e.g., the upper side 130' of the first landing 130*a*). A second stack of conical springs 150*b* can be operatively connected to and/or operatively positioned with respect to the third plunger 140*c* (e.g., the lower side 142" of the head 142 of the third plunger 140*c*) and the second landing 130*b* (e.g., the upper side 130' of the second landing 130*b*). A third stack of conical springs 150*c* can be operatively connected to and/or operatively positioned with respect to the fourth plunger 140*d* (e.g., the lower side 142" of the head 142 of the fourth plunger 140*d*) and the third landing 130*c* (e.g., the upper side 130' of the third landing 130*c*).

Any suitable manner of operative connection can be provided between the stacks of conical springs 150 and the respective landings 130 and plungers 140. For example, the operative connection can include one or more fasteners, one or more welds, one or more brazes, one or more adhesives, and/or one or more forms of mechanical engagements, or any combination thereof. In some instances, the stacks of conical springs 150 may not be attached to their respective landings 130 and/or plungers 140.

Each of the stacks of conical springs 150*a*, 150*b*, 150*c* can have any suitable quantity of the conical springs. In some arrangements, each of the stacks of conical springs 150*a*, 150*b*, 150*c* can include the same number of conical springs. In some arrangements, the quantity of the conical springs in at least one of the stacks can be different from the other stacks. In some arrangements, the conical springs used in each stack can be substantially identical. However, in some arrangements, one or more of the conical springs in one of the stacks can be different from the other conical springs in the same stack or in the other stacks. In some arrangements, the conical springs can be arranged in the same way in each stack. However, in other arrangements, the conical springs in at least one of the stacks can be arranged differently from the other stacks.

FIG. 4A shows the vibration isolator 110 in a non-activated configuration, and FIG. 4B and 4C show examples of the vibration isolator 110 in an activated configuration. In the non-activated configuration, the distal ends 146 of the plungers 140 can be spaced a distance from the respective heads 142 of the neighboring plungers 140.

When a load is imposed upon the head 142 of the first plunger 140*a*, such as from the pin 112, the first plunger 140*a* can be moved downwardly. Eventually, the distal end 146 of the first plunger 140*a* can come into contact with the upper side 142' of the head 142 of the second plunger 140*b*. As the first plunger 140*a* moves further downwardly, the head 142 of the second plunger 140*b* will be moved downwardly. As a result, the first stack of conical springs 150*a* can be compressed. The process can continue with the other plungers 140 and the stacks of conical springs 150. FIGS. 4B and 4C show different stages of compression of the stacks of conical springs 150.

In the arrangement shown in FIG. 4A, the vibration isolator 110 can be in the initial stiffness region 230 of the force-deflection curve 210. As can be seen, the conical springs 150 can be substantially in their neutral condition. In the initial stiffness region 230, the stiffness curve can be substantially linear, increasing from the origin of the graph. The vibration isolator 110 can be relatively stiff in the initial stiffness region 230.

In FIGS. 4B and 4C, the vibration isolator 110 can be in the quasi-zero stiffness region 240 of the force-deflection curve 210. In the quasi-zero stiffness region 240, the force-deflection curve becomes substantially flat. The stiffness becomes very low-zero or substantially zero. The quasi-zero stiffness region 240 allows for good isolation. In the quasi-zero stiffness region 240, the conical springs 150 can become substantially flat, as is shown in FIG. 4C.

It will be appreciated that the non-linear stiffness profile of the vibration isolator 110 according to arrangements described herein can provide improved vibration isolation performance compared to a linear spring type system. A general representation of the performance differences is shown in FIG. 12, which presents a force versus deflection graph 1200. One curve 1202 represents the performance of a vibration isolator according to arrangements described herein. Another curve 1204 represents the performance of a vibration isolator with a linear spring. The curve 1202 includes a quasi-zero stiffness region, but the curve 1204 does not.

While FIGS. 4A-4C present one potential arrangement of a stack of conical springs, it will be understood that arrangements are not limited to the examples shown and described. Further, in some arrangements, the stacks of conical springs can include other elements. Indeed, in some instances, the stack of conical springs can include locking spacers and/or non-locking spacers. Such locking spacers and/or non-locking spacers can be located between neighboring conical springs. Examples of such arrangements are shown in U.S. patent application Ser. No. 17/156,041, which is incorporated herein by reference in its entirety.

Referring to FIG. 5, another example of the vibration isolator 110 is shown. To streamline the discussion, the above description of the outer housing 120, the landings 130, and the plungers 140 applies equally here and will not be repeated. Also, the reference numbers used in FIGS. 4A-4C are used for the like structures in FIG. 5.

In FIG. 5, the stacks of spring members 150 can include stacks of magnetically activated spring members. In one or more arrangements, the magnetically activated spring members can be annular wave springs 900 (FIGS. 9A-9B). The annular wave springs 900 can be made of a metallic-glass. The annular wave springs 900 can be made of an amorphous metal structure. In one or more arrangements, the annular wave springs 900 can be made of Metglas, which is available from Metglas Inc., Conway, S.C. Examples of wave springs are described in Panagiotopoulos et al. "Advanced ultra-light multifunctional metallic-glass wave springs." Materials & Design 192 (2020): 108770, which is incorporated herein by reference in its entirety. In some arrangements, the magnetically activated spring members can be conical springs made of a magnetically responsive material, such as Metglas.

In one or more arrangements, the magnetically activated spring members can be multi-turn wave springs 1000 (FIG. 10). The multi-turn wave springs 1000 can be made of a shape memory alloy. Examples of multi-turn wave springs are described in Spaggiari et al. "Multiphysics modelling and design of shape memory alloy wave springs as linear actuators." Smart Materials, Adaptive Structures and Intelligent Systems. Vol. 44151. 2010, which is incorporated herein by reference in its entirety. In some arrangements, the magnetically activated spring members can be a magnetic elastomer isolator 1100 (FIG. 11). The magnetic elastomer isolator 1100 can include a top plate 1102, laminated magnetorheological elastomer (MRE) and steel layers 1104, a coil 1106, and a yoke 1108 (e.g., a steel yoke). Examples of magnetic elastomer isolators are described in Li et al. "A highly adjustable magnetorheological elastomer base isolator for application of real-time adaptive control." Smart Materials and Structures 22.9 (2013): 095020, which is incorporated herein by reference in its entirety. The magnetically activated spring members can be made of a material whose characteristics or properties change when exposed to a magnetic field. For example, the elastic modulus of the spring members can change when a magnetic field is applied. More particularly, the elastic modules can change to a higher value. The magnetic field can change the stiffness of the spring members.

Further, the vibration isolator 110 can include a magnetic field generator 155. The magnetic field generator 155 can be any structure of device, now known or later developed, for generating a magnetic field. As an example, the magnetic field generator 155 can be a magnetic coil 156 and/or other components. The magnetic coil 156 can be operatively positioned with respect to the spring members 150. In some arrangements, the magnetic coil 156 can be wrapped about at least a portion of the outer peripheral surface 124 of the outer housing 120. The magnetic coil 156 can be operatively connected to one or more power sources (see FIG. 8). The generation of the magnetic field can be controlled by one or more processors (FIG. 8), which can selectively allow or prevent the flow of electrical energy to the magnetic field generator 155.

FIG. 5 shows the vibration isolator 110 in a non-activated configuration. When a load is imposed upon the head 142 of the first plunger 140*a*, such as from the pin 112, the first plunger 140*a* can be moved downwardly. Eventually, the distal end 146 of the first plunger 140*a* can come into contact with the upper side 142' of the head 142 of the second plunger 140*b*. As the first plunger 140*a* moves further downwardly, the head 142 of the second plunger 140*b* will be moved downwardly. As a result, the first stack of magnetically activated spring members 150*a* can be compressed. The process can continue with the other plungers 140 and the stacks of magnetically activated spring members.

Thus, when the vibration isolator is subjected to forces, the magnetic field generator 155 can be activated to alter the performance characteristics of the magnetically activated spring members. As a result, the magnetically activated spring members can be altered so as to be operating in the quasi zero stiffness region of the force-deflection curve to allow for good isolation.

Referring to FIGS. 6A-6B, another example of the vibration isolator 110 is shown. To streamline the discussion, the above description of the outer housing 120, the landings 130, the plungers 140, and the stacks of conical springs 150 made in connection with FIGS. 4A-4C applies equally here and will not be repeated. Also, the reference numbers used in FIGS. 4A-4C are used for the like structures in FIG. 6A-6B. In FIGS. 6A-6B, the outer housing 120 is not shown for clarity.

Here, one or more of the landings 130 can be configured to be selectively movable. The landings 130 can be movable to move out of the way of the associated stack of conical springs 150. The landings can have any suitable movement. In one or more arrangements, the landings 130 can move laterally or radially outward. An example of such movement is shown in FIGS. 6A. As can be seen, the first landing 130*a* is moved laterally outward. As a result, the first landing 130*a* is no longer in the way of the first stack of conical springs 150*a*. Thus, when the second plunger 140*b* is moved downwardly in the longitudinal direction L, the first stack of conical springs 150*a* is not compressed. As a result, the first stack of conical springs 150*a* does not contribute to the performance of the vibration isolator. Rather, in this instance, only the second stack of conical springs 150*b* and the third stack of conical springs 150*c* would contribute to the overall vibration isolation performance of the vibration isolator 110.

The landings 130 can be movable in any suitable manner. For instance, in one or more arrangements, the landings 130 can be operatively connected to one or more actuators 885 (FIG. 8). The actuator(s) 885 can cause the movement of the landings 130. The actuator(s) 885 can be controlled by one or more processor(s) 810 (FIG. 8).

In this example, the first stack of conical springs 150*a* can be operatively connected to the second plunger 140*b*. Thus, when the first landing 130*a* is moved out of the way, the first stack of conical springs 150*a* remains attached to the second plunger 140*b*.

Referring to FIG. 7, another example of the vibration isolator 110 is shown. To streamline the discussion, the above description of the outer housing 120, the landings 130, the plungers 140, and the stacks of conical springs 150 made in connection with FIGS. 4A-4C applies equally here and will not be repeated. Also, the reference numbers used in FIGS. 4A-4C are used for the like structures in FIG. 7.

In FIG. 7, the vibration isolator 110 can include one or more plunger impeding structures. The plunger impeding structures can be a stopper (e.g., a rubber stopper) 160 and/or viscous fluid. The shaft 144 of the plungers 140 can be configured to pass through the plunger impeding structures.

The vibration isolator can include a first stopper 160*a*, a second stopper 160*b*, and a third stopper 160*c*. In some arrangements, the first stopper 160*a*, the second stopper 160*b*, and the third stopper 160*c* can be supported on a respective one of the landings 130*a*, 130*b*, 130*c*. In some arrangements, the first stopper 160*a*, the second stopper 160*b*, and the third stopper 160*c* can be operatively connected to a respective one of the landings 130*a*, 130*b*, 130*c*, such as by one or more fasteners, one or more adhesives, and/or one or more forms of mechanical engagement, or any combination thereof.

It will be appreciated that as the plungers 140 are depressed. The plunger impeding structures can slow the downward movement of the plungers 140. As a result, the plunger impeding structures can alter the timing of the compression of the stacks of conical springs 150 to attain desired performance characteristics.

In some arrangements, the plunger impeding structures can be substantially identical to each other. However, in other arrangements, one or more of the plunger impeding structures can be different from the other plunger impeding structures in one or more respects.

In some arrangements, each of the landings 130 can have a plunger impeding structure. However, in other arrangements, one or more of the landings 130 may not have a plunger impeding structure.

It should be noted that in the arrangements, the vibration isolator 110 can include a magnetorheological fluid (MR fluid). The MR fluid can be used in lieu of the spring members. Alternatively, the MR fluid can be used in combination with any of the arrangements shown in FIGS. 4-7 above.

Referring to FIG. 8, an example of a system 800 for vibration isolation of a seat or saddle is shown. The system 800 can be used in connection with any type of seat or saddle, such as a bicycle seat or saddle.

The system 800 can include various elements. Some of the possible elements of the system 800 are shown in FIG. 8 and will now be described. It will be understood that it is not necessary for the system 800 to have all of the elements shown in FIG. 8 or described herein. The system 800 can have any combination of the various elements shown in FIG. 8. Further, the system 800 can have additional elements to those shown in FIG. 8. In some arrangements, the system 800 may not include one or more of the elements shown in FIG. 8.

The system 800 can include one or more processors 810, one or more data stores 820, one or more sensors 830, one or more power sources 840, one or more input interfaces 850, one or more output interfaces 860, a seat or saddle system 870, one or more control modules 880, and one or more actuators 885. Each of these elements will be described in turn below.

As noted above, the system 800 can include one or more processors 810. "Processor" means any component or group of components that are configured to execute any of the processes described herein or any form of instructions to carry out such processes or cause such processes to be performed. The processor(s) 810 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 810 can include at least one hardware circuit (e.g., an integrated circuit) configured to carry out instructions contained in program code. In arrangements in which there is a plurality of processors 810, such processors can work independently from each other, or one or more processors can work in combination with each other.

The system 800 can include one or more data stores 820 for storing one or more types of data. The data store(s) 820 can include volatile and/or non-volatile memory. Examples of suitable data stores 820 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 820 can be a component of the processor(s) 810, or the data store(s) 820 can be operatively connected to the processor(s) 810 for use thereby.

The system 800 can include one or more sensors 830. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 800 includes a plurality of sensors 830, the sensors can work independently from each other. Alternatively, two or more of the sensors can work in combination with each other. In such case, the two or more sensors can form a sensor network. The sensor(s) 830 can be operatively connected to the processor(s) 810, the data store(s) 820, and/or other elements of the system 800 (including any of the elements shown in FIG. 10).

The sensor(s) 830 can include any suitable type of sensor. Various examples of different types of sensors will be described herein. However, it will be understood that the embodiments are not limited to the particular sensors described.

The sensor(s) 830 can include one or more weight sensors 832. The weight sensor(s) 832 can include any sensor, now known or later developed, configured to detect, determine, assess, monitor, measure, quantify and/or sense any information or data about a weight of an occupant of the saddle 102. The weight sensor(s) 832 can be located under the saddle 102.

As noted above, the system 800 can include one or more power sources 840. The power source(s) 840 can be any power source capable of and/or configured to energize various elements such as actuators and magnetic field generators, as will be described later. For example, the power source(s) 840 can include one or more batteries, one or more fuel cells, one or more generators, one or more alternators, one or more solar cells, and combinations thereof.

The system 800 can include one or more input interfaces 850. An "input interface" includes any device, component, system, element or arrangement or groups thereof that enable information/data to be entered into a machine. The input interface(s) 850 can receive an input from a person (e.g., a bicycle rider). Any suitable input interface 850 can be used, including, for example, a keypad, display, touch screen, multi-touch screen, switch, button, joystick, mouse, trackball, microphone and/or combinations thereof.

The system 800 can include one or more output interfaces 860. An "output interface" includes any device, component, system, element or arrangement or groups thereof that enable information/data to be presented to a person. The output interface(s) 860 can present information/data to an occupant of the saddle 102. The output interface(s) 860 can include a display, and earphone, and/or a speaker. Some components of the system 800 may serve as both a component of the input interface(s) 850 and a component of the output interface(s) 860.

The system 800 can include a set or saddle system 870. The saddle system 870 can include a seat or a saddle and a vibration isolator. The above description of the saddle 102 and the vibration isolator 110 apply equally the same elements in the saddle system 870.

The system 800 can include one or more actuators 885. The actuator(s) 885 can be operatively connected to effect various things. For instance, the actuator(s) 885 can be operatively connected to cause movement of one or more of the landings 130. The actuator(s) 885 can be operatively connected to one or more of the landings 130. In one or more arrangements, the actuator(s) 885 can include servo motors, pneumatic actuators, hydraulic pistons, relays, solenoids, and/or piezoelectric actuators, just to name a few possibilities. The actuator(s) 885 can include piston(s), push and/or pull bar(s) or rod(s), pulley(s), gear(s), gear track(s), and/or magnet(s), just to name a few possibilities. The actuator(s) 885 can include any combination of the above. The actuator(s) 885 can be selectively activated to cause the one or more of the landings 130 to be moved into and out of various positions. In one or more arrangements, the actuator(s) 885 can be activated responsive to receiving signals or other inputs from the control module(s) 880 and/or from a user (e.g., via the input interface(s) 850).

The system 800 can include one or more modules, at least some of which will be described herein. The modules can be implemented as computer readable program code that, when executed by a processor, implement one or more of the various processes described herein. One or more of the modules can be a component of the processor(s) 810, or one or more of the modules can be executed on and/or distributed among other processing systems to which the processor(s) 810 is operatively connected. The modules can include instructions (e.g., program logic) executable by one or more processor(s) 810. Alternatively or in addition, one or more data stores 820 may contain such instructions.

In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The system 800 can include one or more control modules 880. The control module(s) 880 can include profiles and logic for actively controlling the stiffness characteristics of the vibration isolator 110. The control module(s) 880 can be configured to determine when the stiffness characteristics of the vibration isolator 110, such as the stiffness profile, should be adjusted. The control module(s) 880 can be configured to do so in any suitable manner. For instance, the control module(s) 880 can be configured to analyze data or information acquired by the sensor(s) 830 (e.g., the weight sensor(s) 1032 and/or other sensors). The control module(s) 880 can retrieve raw data from the sensor(s) 830 and/or from the data store(s) 820. The control module(s) 880 can use profiles, parameters, or setting loaded into the control module(s) 880 and/or stored in the data store(s) 820. Alternatively or additionally, the control module(s) 880 can be configured to detect user inputs (e.g., commands) provided on the input interface(s) 850.

The control module(s) 880 can analyze the sensor data to determine an appropriate action for adjusting the performance characteristics of the vibration isolator 110. The control module(s) 880 can be configured to cause the stiffness of the vibration isolator 110 to be adjusted. As used herein, "cause" or "causing" means to make, force, compel, direct, command, instruct, and/or enable an event or action to occur or at least be in a state where such event or action may occur, either in a direct or indirect manner.

For instance, the control module(s) 880 can cause one or more landings 130 of the vibration isolator 110 to be moved out of the way. For instance, the control module(s) 880 can activate one or more of the actuators 885, which can cause the landings 130 to be moved out of the way. As a result, the spring members 150 associated with the landing(s) 130 that have been moved do contribute to the performance of the vibration isolator 110. In some arrangements, the control module(s) 880 can be configured to selectively permit, restrict, adjust, alter, and/or prevent the flow of electrical energy from the power source(s) 840 to the actuator(s) 885. The control module(s) 880 can be configured send control signals or commands over a communication network 890 to the actuator(s) 885 or to other elements of the system 800.

The control module(s) 880 can be configured to cause the stiffness characteristics of the vibration isolator 110 to be adjusted based on one or more parameters. For instance, the control module(s) 880 can be configured to cause the stiffness characteristics of the vibration isolator 110 to be adjusted based on real-time conditions as detected by the sensor(s) 830, such as seat occupant weight. Based on such real-time conditions, the control module(s) 880 can determine suitable stiffness characteristics for the vibration isolator 110. The control module(s) 880 can query the data store(s) 820 for data about the spring members 150. For instance, the control module(s) 880 can query the spring member data, such as the stress-strain curves for the spring members 150, including the performance characteristics based on how many stacks of spring members are used. The control module(s) 880 can be configured to select or determine an appropriate number of stacks of spring members 150 to achieve a desired stiffness characteristic.

The selective varying of the stiffness characteristics of the vibration isolator 110 can be performed at any suitable time. For instance, the selective varying can be performed on a continuously, periodically, irregularly, or even randomly.

In some instances, the control module(s) 880 can be configured to cause the stiffness characteristics of the vibration isolator 110 to be selectively adjusted based on user inputs (e.g., commands). For instance, a user can provide an input on the input interface(s) 850. The input can be to adjust the stiffness characteristics of the vibration isolator 110. The control module(s) 880 can be configured to cause the stiffness characteristics of the vibration isolator 110 to be adjusted in accordance with the user input.

In some arrangements, the control module(s) 880 can be configured to selectively activate and deactivate the magnetic field generator 500 associated with the vibration isolator 110 (see FIG. 5). The control module(s) 880 can be configured to vary the strength of the magnetic field produced by the magnetic field generator 500. In some arrangements, the control module(s) 880 can be configured to selectively permit, restrict, adjust, alter, and/or prevent the flow of electrical energy from the power source(s) 840 to the actuator(s) 885. The control module(s) 880 can be configured send control signals or commands over a communication network 890 to the actuator(s) 885 or to other elements of the system 800. In some arrangements, the control module(s) 880 can be configured to vary the strength of the magnetic field produced by the magnetic field generator 500 based on a weight of an occupant of the saddle 102. Such weight can be determined by the weight sensor(s) 832.

The various elements of the system 800 can be communicatively linked to one another or one or more other elements through one or more communication networks 890. As used herein, the term "communicatively linked" can include direct or indirect connections through a communication channel, bus, pathway or another component or system. A "communication network" means one or more components designed to transmit and/or receive information from one source to another. The data store(s) 820 and/or one or more other elements of the system 800 can include and/or execute suitable communication software, which enables the various elements to communicate with each other through the communication network and perform the functions disclosed herein.

The one or more communication networks 890 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Figure 13:
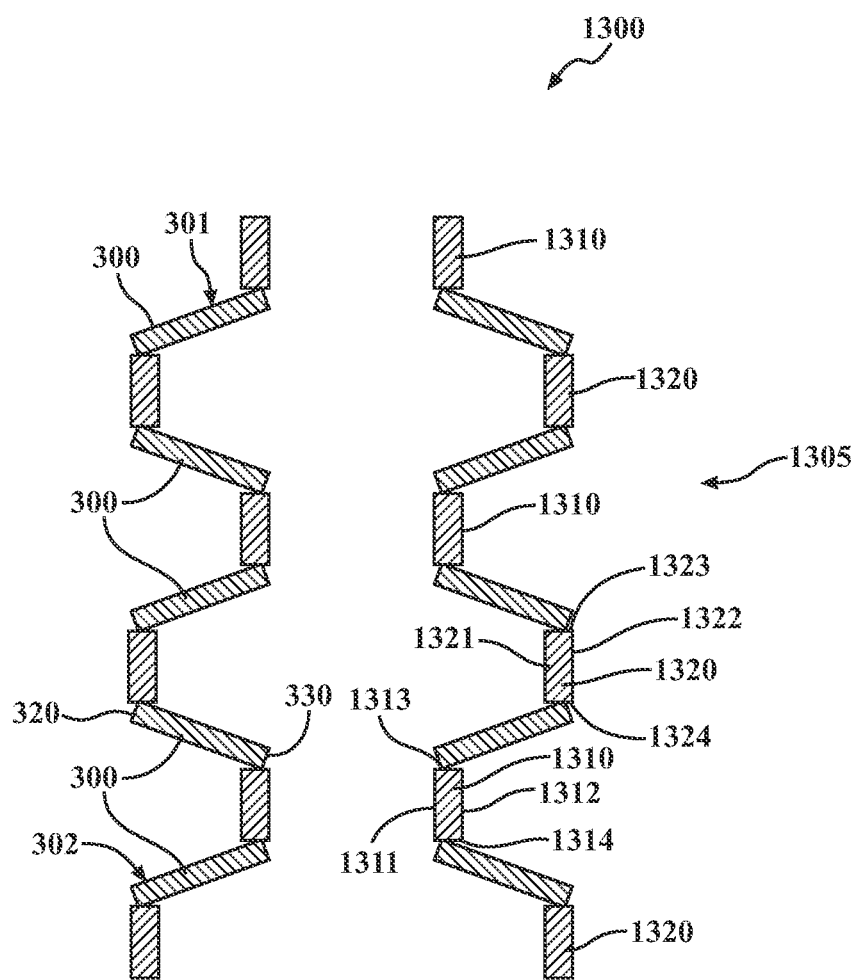
FIG. 13 is a cross-sectional view of an example of a stack of conical springs for use in a vibration isolator, showing an alternating single conical spring configuration with low profile spacers.

Additional stacks of conical springs will now be described. Referring to FIG. 13, an example of an arrangement 1300 of spring members for use in a vibration isolator is shown in a cross-sectional view. The arrangement 1300 can include a plurality of the conical springs 300 arranged in a stack 1305. The stack 1305 of the plurality of the conical springs 300 can have a first outermost conical spring 301 and a second outermost conical spring 302.

The conical springs 300 can be arranged in an alternating single conical spring configuration. Thus, the outer diameter body portion 320 of one conical spring 300 can face the outer diameter body portion 320 of a neighboring one of the conical springs 300. The neighboring conical springs 300 can be separated from each other by spacers, as will be described below. It will be appreciated that the outer diameter body portion 320 of the outermost conical springs 301, 302 may or may not face another one of the conical springs 300. For example, in the particular arrangement shown in FIG. 13, the outer diameter body portion 320 of the second outermost conical spring 302 does not face another one of the conical springs 300.

Further, the inner diameter body portion 330 of one conical spring 300 can face the inner diameter body portion 330 of a neighboring one of the conical springs 300. It will be appreciated that the inner diameter body portion 330 of the outermost conical springs 301, 302 may or may not face another one of the conical springs 300. For example, in the particular arrangement shown in FIG. 13, the inner diameter body portion 330 of the first outermost conical spring 301 does not face another one of the conical springs 300.

The arrangement 1300 can further include a plurality of inner spacers 1310 and a plurality of outer spacers 1320. The inner spacers 1310 can separate the inner diameter body portion 330 of neighboring conical springs 300. The outer spacers 1320 can separate the outer diameter body portion 320 of neighboring conical springs 300. In some arrangements, the plurality of inner spacers 1310 can be substantially identical to each other. In other arrangements, at least one of the inner spacers 1310 can be different from the other inner spacers 1310 in or more respects. In some arrangements, the plurality of outer spacers 1320 can be substantially identical to each other. In other arrangements, at least one of the outer spacers 1320 can be different from the other outer spacers 1320 in or more respects.

The inner spacers 1310 and the outer spacers 1320 can be generally cylindrical members. In one or more arrangements, the inner spacers 1310 and the outer spacers 1320 can have a substantially rectangular shaped cross-sectional shape. Thus, the inner spacers 1310 can include an inner wall 1311, an outer wall 1312, a first ledge 1313, and a second ledge 1314. The outer spacers 1320 can include an inner wall 1321, an outer wall 1322, a first ledge 1323, and a second ledge 1324.

The inner spacers 1310 and the outer spacers 1320 can be configured as non-locking spacers. Thus, the outer diameter body portion 320 of the conical springs 300 can rest on or contact the first ledge 1323 or the second ledge 1324 of the outer spacers 1320. Similarly, the inner diameter body portion 330 can rest on or contact the first ledge 1313 or the second ledge 1314 of the inner spacers 1310. Thus, the inner spacers 1310 and the outer spacers 1320 do not lockingly engage the conical springs 300. As a result, the stack 1305 may not, in and of itself, have any lateral load bearing capability.

The inner spacers 1310 and/or the outer spacers 1320 can be low profile spacers. In such case, the inner spacers 1310 do not extend beyond or do not extend substantially beyond the inner diameter body portion 330 of the conical springs 300. The inner wall 1311 of the inner spacers 1310 can be substantially aligned or substantially flush with the inner diameter body portion 330 of the conical springs 300. The outer spacers 1320 do not extend beyond or do not extend substantially beyond the outer diameter body portion 320 of the conical springs 300. The outer wall 1322 of the outer spacers 1320 can be substantially aligned or substantially flush with the outer diameter body portion 320 of the conical springs 300.

FIG. 13 shows the conical springs 300 in the stack 1305 as being in a neutral position. However, as will be explained in more detail later, the arrangement 1300 can be configured to allow the conical springs 300 in the stack 1305 to become flat or even inverted.

Figure 14:
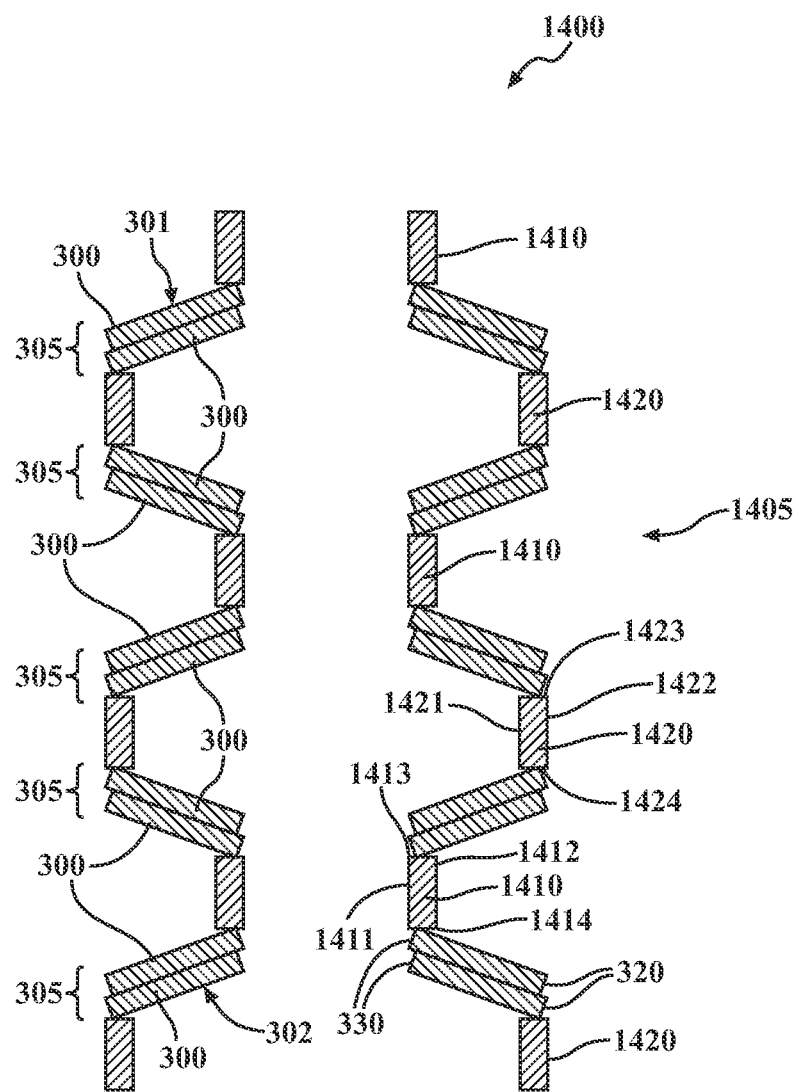
FIG. 14 is a cross-sectional view of an example of a stack of conical springs for use in a vibration isolator, showing an alternating double conical spring configuration with low profile spacers.

Referring to FIG. 14, an example of an arrangement 1400 of spring members for use in a vibration isolator is shown in a cross-sectional view. The arrangement 1400 can include a plurality of the conical springs 300 arranged in a stack 1405. The stack 1405 of the plurality of the conical springs 300 can have a first outermost conical spring 301 and a second outermost conical spring 302.

The conical springs 300 can be arranged in an alternating double conical spring configuration. Here, the conical springs 300 can be arranged in sets 305 of a plurality of conical springs 300. In the example shown, each set 305 can include two conical springs 300. The two conical springs 300 can be in a nested or stacked configuration. However, it will be appreciated that the "set" can have any quantity of conical springs. It will be appreciated that double stacking the conical springs 300 can result in a doubling of the spring force.

Thus, the outer diameter body portion 320 of one set 305 of conical springs 300 can face the outer diameter body portion 320 of a neighboring set 305 of the conical springs 300. The neighboring sets 305 of the conical springs 300 can be separated from each other by spacers, as will be described below.

It will be appreciated that the outer diameter body portion 320 of the outermost conical springs 301, 302 may or may not face another conical spring 300 or pair of conical springs 300. For example, in the particular arrangement shown in FIG. 14, the outer diameter body portion 320 of the second outermost conical springs 302 does not face another conical spring 300 or pair of conical springs 300. Likewise, the inner diameter body portion 330 of the first outermost conical springs 301 does not face another conical spring 300 or pair of conical springs 300.

The arrangement 1400 can further include a plurality of inner spacers 1410 and a plurality of outer spacers 1420. The inner spacers 1410 can separate the inner diameter body portion 330 of neighboring pairs of the conical springs 300. The outer spacers 1420 can separate the outer diameter body portion 320 of neighboring pairs of the conical springs 300. In some arrangements, the plurality of inner spacers 1410 can be substantially identical to each other. In other arrangements, at least one of the inner spacers 1410 can be different from the other inner spacers 1410 in or more respects. In some arrangements, the plurality of outer spacers 1420 can be substantially identical to each other. In other arrangements, at least one of the outer spacers 1420 can be different from the other outer spacers 1420 in or more respects.

The inner spacers 1410 and the outer spacers 1420 can be generally cylindrical members. In one or more arrangements, the inner spacers 1410 and the outer spacers 1420 can have a substantially rectangular shaped cross-sectional shape. Thus, the inner spacers 1410 can include an inner wall 1411, an outer wall 1412, a first ledge 1413, and a second ledge 1414. The outer spacers 1420 can include an inner wall 1421, an outer wall 1422, a first ledge 1423, and a second ledge 1424.

The inner spacers 1410 and the outer spacers 1420 can be configured as non-locking spacers. Thus, the outer diameter body portion 320 of one of the conical springs 300 of a set 305 can rest on or contact the first ledge 1423 or the second ledge 1424 of the outer spacers 1420. Similarly, the inner diameter body portion 330 of one conical spring 300 of a set 305 can rest on or contact the first ledge 1413 or the second ledge 1414 of the inner spacers 1410. Thus, the inner spacers 1410 and the outer spacers 1420 do not lockingly engage the conical springs 300. As a result, the stack 1405 may not, in and of itself, have any lateral load bearing capability.

The inner spacers 1410 and/or the outer spacers 1420 can be low profile spacers. In such case, the inner spacers 1410 do not extend beyond or do not extend substantially beyond the inner diameter body portion 330 of the conical springs 300. The inner wall 1411 of the inner spacers 1410 can be substantially aligned or substantially flush with the inner diameter body portion 330 of the conical springs 300. The outer spacers 1420 do not extend beyond or do not extend substantially beyond the outer diameter body portion 320 of the conical springs 300. The outer wall 1422 of the outer spacers 1420 can be substantially aligned or substantially flush with the outer diameter body portion 320 of the conical springs 300.

FIG. 14 shows the pairs of conical springs 300 in the stack 1405 as being in a neutral position. However, as will be explained in more detail later, the arrangement 1400 can be configured to allow the sets 305 of conical springs 300 in the stack 1405 to become flat or even inverted.

Figure 15:
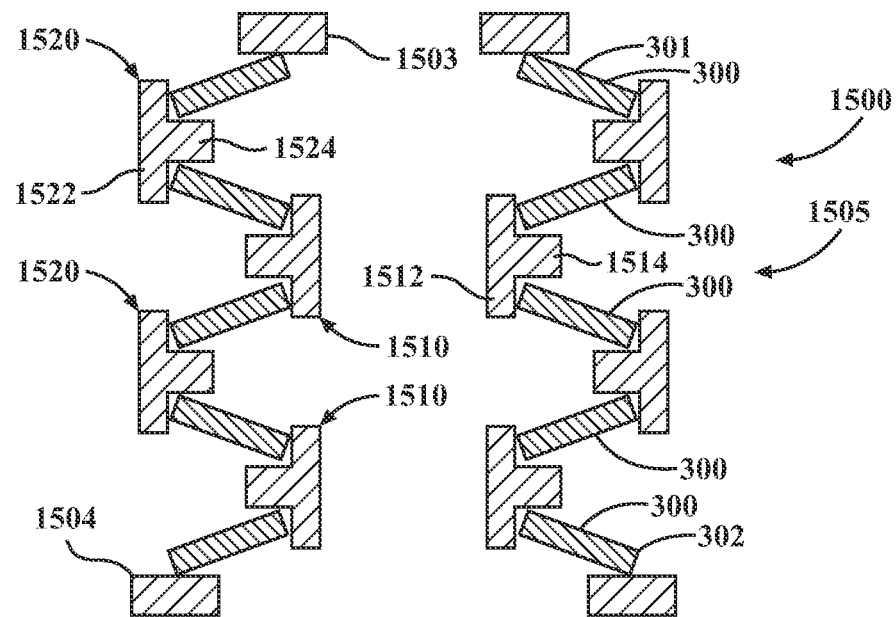
FIG. 15 is a cross-sectional view of an example of a stack of conical springs for use in a vibration isolator, showing an alternating single conical spring configuration with non-locking spacers.

Referring to FIG. 15, an example of an arrangement 1500 of spring members for use in a vibration isolator is shown in a cross-sectional view. The arrangement 1500 can include a plurality of the conical springs 300 arranged in a stack 1505. The stack 1505 of the plurality of the conical springs 300 can have a first outermost conical spring 301 and a second outermost conical spring 302.

The arrangement 1500 can further include a plurality of inner spacers 1510 and a plurality of outer spacers 1520. In some instances, the arrangement 1500 can include end caps or end spacers 1503, 1504 at the opposite ends of the stack 1505. The inner spacers 1510 can separate the inner diameter body portion 330 of neighboring pairs of the conical springs 300. The outer spacers 1520 can separate the outer diameter body portion 320 of neighboring pairs of the conical springs 300. In some arrangements, the plurality of inner spacers 1510 can be substantially identical to each other. In other arrangements, at least one of the inner spacers 1510 can be different from the other inner spacers 1510 in or more respects. In some arrangements, the plurality of outer spacers 1520 can be substantially identical to each other. In other arrangements, at least one of the outer spacers 1520 can be different from the other outer spacers 1520 in or more respects.

The inner spacers 1510 and the outer spacers 1520 can be generally cylindrical members. In one or more arrangements, the inner spacers 1510 and the outer spacers 1520 can have a substantially t-shaped cross-sectional shape. Thus, the inner spacers 1510 can include an inner wall portion 1512 and a transverse ledge portion 1514. The transverse ledge portion 1514 can extend outwardly from the inner wall portion 1512. The transverse ledge portion 1514 can be substantially perpendicular to the inner wall portion 1512. The outer spacers 1520 can include an outer wall portion 1522 and a transverse ledge portion 1524. The transverse ledge portion 1524 can extend inwardly from the outer wall portion 1522. The transverse ledge portion 1524 can be substantially perpendicular to the outer wall portion 1522.

The inner spacers 1510 and the outer spacers 1520 can be configured as non-locking spacers. Thus, the outer diameter body portion 320 of the conical springs 300 can rest on or contact the transverse ledge portion 1524 of the outer spacers 1520. Similarly, the inner diameter body portion 330 can rest on or contact the transverse ledge portion 1514 of the inner spacers 1510. Thus, the inner spacers 1510 and the outer spacers 1520 do not lockingly engage the conical springs 300.

FIG. 15 shows the conical springs 300 in the stack 1505 as being in a neutral position. However, as will be explained in more detail later, the stack 1505 can be configured to allow the conical springs 300 in the stack 1505 to become flat or even inverted.

Figure 16:
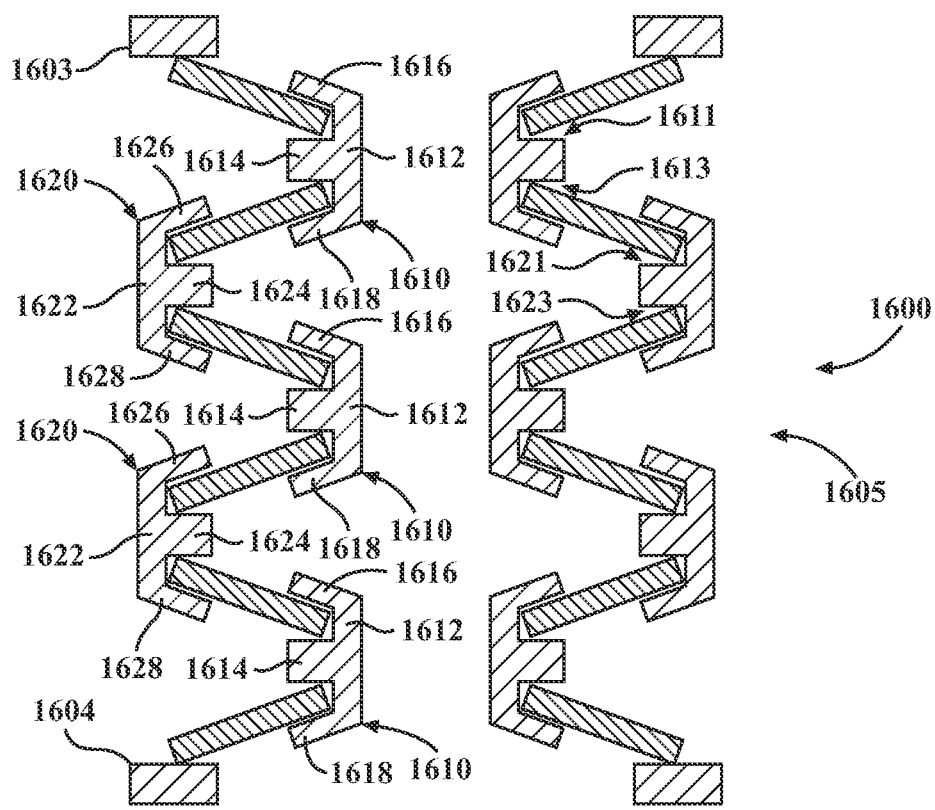
FIG. 16 is a cross-sectional view of an example of a stack of conical springs for use in a vibration isolator, showing an alternating single conical spring configuration with locking spacers.

Referring to FIG. 16, an example of an arrangement 1600 of spring members for use in a vibration isolator is shown in a cross-sectional view. The arrangement 1600 can include a plurality of the conical springs 300 arranged in a stack 1605. The stack 1605 of the plurality of the conical springs 300 can have a first outermost conical spring 301 and a second outermost conical spring 302.

The arrangement 1600 can further include a plurality of inner spacers 1610 and a plurality of outer spacers 1620. In some instances, the arrangement 1600 can include end caps or end spacers 1603, 1604 at the opposite ends of the stack 1605. The inner spacers 1610 can separate the inner diameter body portion 330 of neighboring pairs of the conical springs 300. The outer spacers 1620 can separate the outer diameter body portion 320 of neighboring pairs of the conical springs 300. In some arrangements, the plurality of inner spacers 1610 can be substantially identical to each other. In other arrangements, at least one of the inner spacers 1610 can be different from the other inner spacers 1610 in or more respects. In some arrangements, the plurality of outer spacers 1620 can be substantially identical to each other. In other arrangements, at least one of the outer spacers 1620 can be different from the other outer spacers 1620 in or more respects.

The inner spacers 1610 and the outer spacers 1620 can be generally cylindrical members. In one or more arrangements, the inner spacers 1610 and the outer spacers 1620 can have a substantially E-shaped or a substantially 3-shaped cross-sectional shape. Thus, the inner spacers 1610 can include an inner wall portion 1612, a central transverse ledge portion 1614, an upper transverse ledge portion 1616, and a lower transverse ledge portion 1618. It will be appreciated that the terms "upper" and "lower" are used for convenience in this respect relative to the orientation of the inner spacers 1610 shown in FIG. 16. However, it will be appreciated that the upper transverse ledge portion 1616 and the lower transverse ledge portion 1618 may not actually be above or below the central transverse ledge portion 1614 depending on the orientation of the arrangement 1600 or the vibration isolator in which the arrangement 1600 is used. A first groove 1611 can be defined by the inner wall portion 1612, the central transverse ledge portion 1614, and the upper transverse ledge portion 1616. A second groove 1613 can be defined by the inner wall portion 1612, the central transverse ledge portion 1614, and the lower transverse ledge portion 1618.

The central transverse ledge portion 1614 can extend outwardly from the inner wall portion 1612. The central transverse ledge portion 1614 can be substantially perpendicular to the inner wall portion 1612. In some arrangements, the upper transverse ledge portion 1616 and the lower transverse ledge portion 1618 can be non-parallel to the central transverse ledge portion 1614. In some arrangements, the upper transverse ledge portion 1616 and the lower transverse ledge portion 1618 can be non-parallel to each other.

The outer spacers 1620 can include an outer wall portion 1622, a central transverse ledge portion 1624, an upper transverse ledge portion 1626, and a lower transverse ledge portion 1628. Again, the terms "upper" and "lower" are used merely for convenience in this respect relative to the orientation of the inner spacers 1610 shown in FIG. 16. A first groove 1621 can be defined by the outer wall portion 1622, the central transverse ledge portion 1624, and the upper transverse ledge portion 1626. A second groove 1623 can be defined by the outer wall portion 1622, the central transverse ledge portion 1624, and the lower transverse ledge portion 1628.

The central transverse ledge portion 1624 can extend outwardly from the outer wall portion 1622. The central transverse ledge portion 1624 can be substantially perpendicular to the outer wall portion 1622. In some arrangements, the upper transverse ledge portion 1626 and the lower transverse ledge portion 1628 can be non-parallel to the central transverse ledge portion 1624. In some arrangements, the upper transverse ledge portion 1626 and the lower transverse ledge portion 1628 can be non-parallel to each other.

The inner spacers 1610 and the outer spacers 1620 can be configured as locking spacers. The outer diameter body portion 320 of the conical springs 300 can be received in one of the first groove 1621 and the second groove 1623 of the outer spacer 1620. Thus, the outer diameter body portion 320 of the conical springs 300 can be lockingly engaged by and/or retainably received in the respective one of the first groove 1621 and the second groove 1623 of the outer spacer 1620. Similarly, the inner diameter body portion 330 of the conical springs 300 can be received in one of the first groove 1611 and the second groove 1613 of the inner spacer 1610. Thus, the inner diameter body portion 330 of the conical springs 300 can be lockingly engaged by and/or retainably received in the respective one of the first groove 1611 and the second groove 1613 of the inner spacer 1610.

FIG. 16 shows the conical springs 300 in the stack 1605 as being in a neutral position. However, as will be explained in more detail later, the stack 1605 can be configured to allow the conical springs 300 in the stack 1605 to become flat or even inverted.

FIG. 15 shows an example in which the inner spacers 1510 and the outer spacers 1520 are non-locking spacers, and FIG. 16 shows an example in which the inner spacers 1610 and the outer spacers 1620 are locking spacers. However, it will be understood that arrangements described herein are not limited in this regard. Indeed, the vibration isolators can use any combination of locking, non-locking spacers, and/or other types of spacers for the inner spacers and/or the outer spacer. For example, the inner spacers can be locking spacers, and the outer spacers can be non-locking spacers, or vice versa. As another example, the inner spacers can be all locking spacers, all non-locking spacers, or any combination of locking spacers and non-locking spacers. Similarly, the outer spacers can be all locking spacers, all non-locking spacers, or any combination of locking spacers and non-locking spacers.

Further, it will be appreciated that other arrangements of spring members can be used. Indeed, additional examples of spring member arrangements and/or vibration isolators can include any of those disclosed in U.S. Pat. Nos. 10,371,229; 10,677,310; and 11,137,045, which are incorporated herein by reference in their entireties.

Figure 17:
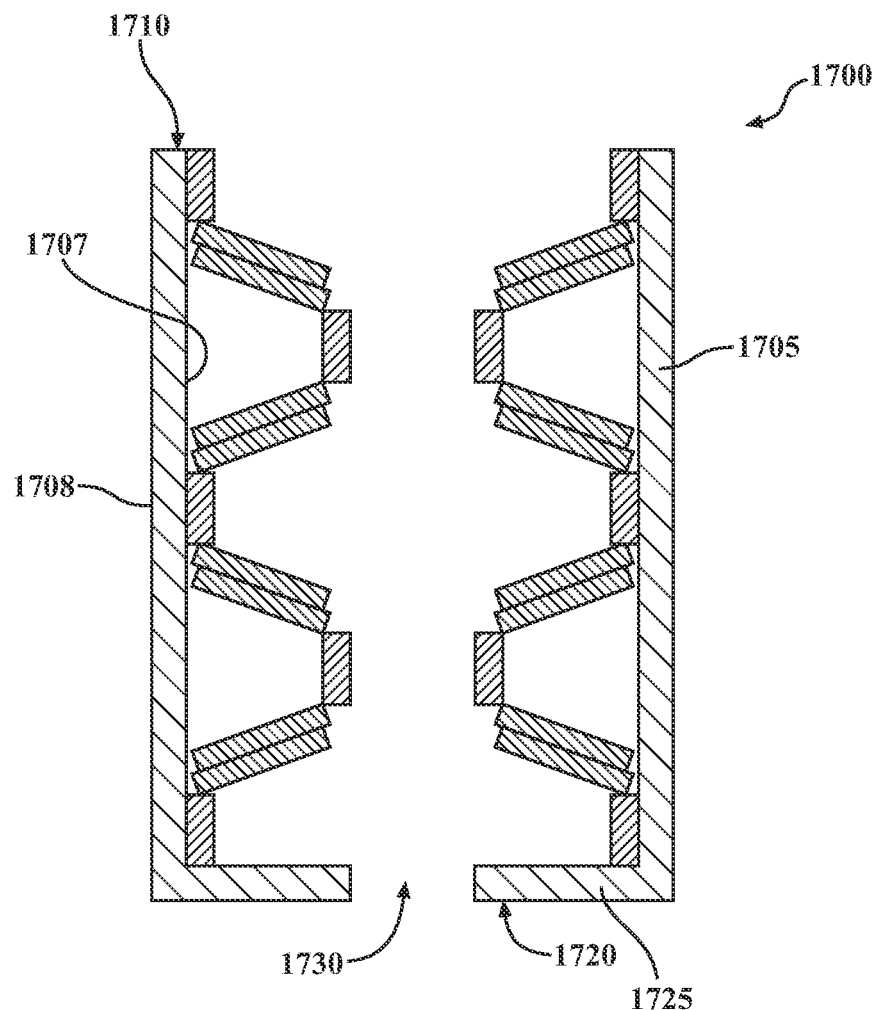
FIG. 17 is an example if a vibration isolator cartridge with a stack of conical springs disposed therein.

As noted above, the various arrangements of spring members can be used in connection with a vibration isolator. Referring to FIG. 17, an example of a vibration isolator cartridge 1700 is shown. The vibration isolator cartridge 1700 can include a housing 1705. The housing 1705 can have any suitable size, shape, and/or configuration. In one or more arrangements, the housing 1705 can be substantially cylindrical in shape. The housing 1705 can be sized to be received in another structure, such as a seat post or other portion of a bicycle. The housing 1705 can be made of any suitable material, including metal or plastics, just to name a few possibilities.

The housing 1705 can have an inner wall 1707 and an outer wall 1708. The housing 1705 can include an upper end 1710 and a lower end 1720. It will be appreciated that the terms "upper" and "lower" are used for convenience in this respect relative to the orientation of the vibration isolator cartridge 1700 shown in FIG. 17 and is not intended to be limiting. Of course, when the vibration isolator cartridge 1700 is in use, it can have any suitable orientation. The upper end 1710 can be open. The lower end 1720 can be at least partially open, such as by an aperture 1730 defined therein. The lower end 1720 can include a lower wall portion 1725.

A plurality of conical springs can be operatively positioned within the housing 1705. In the example shown in FIG. 17, a plurality of conical springs can be arranged in a stack in in an alternating double conical spring configuration, similar to that shown in FIG. 14. With such an arrangement of the plurality of conical springs, it will be appreciated that the outer diameter body portion of the conical springs and the outer spacers can be adjacent to an inner wall of the housing. Thus, it will be appreciated that the inner wall 1707 of the housing 1705 can keep the plurality of conical springs substantially concentrically aligned. The housing 1705 can provide lateral support for the stack of the conical springs.

The vibration isolator cartridge 1700 can also include a plunger. The plunger can be configured to compress the stack of conical springs, as will be described herein. For clarity, the plunger is not shown in FIG. 17.

Figure 18A:
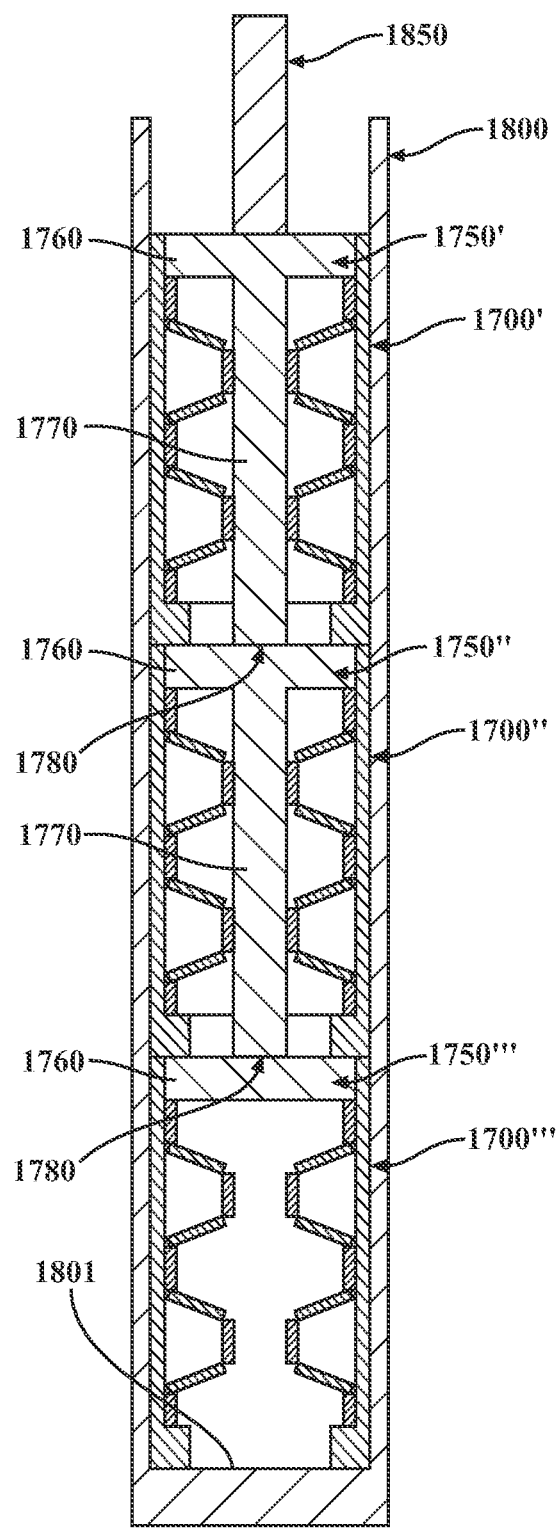
FIG. 18A is a cross-sectional view of a portion of a bicycle, showing a plurality of isolator cartridges stacked within a seat post for a bicycle saddle, the plurality of isolator cartridges being in a non-compressed condition.

The vibration isolator cartridges 1700 can be used in any application in which vibration isolation is desired. For instance, the vibration isolator cartridges 1700 can be used in connection with bicycles. FIG. 18A is a cross-sectional view of a portion of a bicycle. More particularly, FIG. 18A shows a plurality of vibration isolator cartridges 1700', 1700", 1700'" stacked within a seat post 1800 for a bicycle saddle. The vibration isolator cartridges 1700', 1700", 1700'" can be stacked in an end-to-end manner. Thus, the lower end 1720 of the vibration isolator cartridges 1700' can contact and/or can be supported on the upper end 1710 of the vibration isolator cartridges 1700", and the lower end 1720 of the vibration isolator cartridges 1700" can contact and/or be supported on the upper end 1710 of the vibration isolator cartridges 1700∴".

As noted above, each of the vibration isolator cartridges 1700', 1700", 1700' can include a plunger 1750', 1750", 1750'", respectively. The plungers 1750', 1750", 1750' can be any movable structure and can have any suitable configuration. For instance, in one or more arrangements, one or more of the plungers 1750', 1750", 1750" can include a head 1760 and a shaft 1770. The shaft 1770 can extend from the head 1760. The shaft 1770 can extend to a distal end 1780. The shaft 1770 can pass through the interior of the stack of the conical springs 300 in the vibration isolator cartridges 1700', 1700", 1700'".

In some instances, one or more of the plungers may only include the head 1760. The plunger 1750' is an example of such a plunger. The vibration isolator cartridge 1700'" is the lowermost cartridge in the stack of vibration isolator cartridges. As such, a shaft is not needed on the plunger 1750'" because there are no further plungers to depress. Also, a shaft would bottom out on a bottom 1801 of the seat post 1800.

The head 1760 can have any suitable size, shape, and/or configuration. The shaft 1770 can have any suitable size, shape, and/or configuration. The head 1760 and the shaft 1770 can be a unitary structure, or they can be separate pieces subsequently joined together. In some arrangements, the head 1760 can be substantially circular, rectangular, polygonal, or triangular in conformation. In some arrangements, the shaft 1770 can have a substantially circular, rectangular, polygonal, or triangular cross-sectional shape. In some arrangements, the shafts 1770 of the plungers 1750 can be substantially aligned with each other within the vibration isolator cartridge 1700.

The plungers 1750 can be substantially identical to each other. Alternatively, one or more of the plungers 1750 can be different from the other plungers 1750 in one or more respects, including, for example, head width, head shape, head thickness, shaft length, shaft diameter or width, and/or shaft cross-sectional shape.

In some arrangements, the head 1760 and a portion of the shaft 1770 of the plunger 1750 can extend outside of the housing 1705. This exposed portion of the plunger 1750 can engage with the engaging structure 1850. However, in some arrangements, the head 1760 of the plunger 1750 associated with the uppermost vibration isolator cartridge can be substantially flush with the upper end 1710 of the housing 1705. In some arrangements, the head 1760 of the plunger 1750 associated with the uppermost vibration isolator cartridge can be recessed from the upper end 1710 of the housing 1705. The plungers 1750 can be made of any suitable material, including, for example, metals or plastics.

It will be appreciated that the modular configuration of the vibration isolator cartridges 1700', 1700", 1700'" can allow a suitable plunger to be used as appropriate and can allow the plungers to be readily removed and/or exchanged. Likewise, the vibration isolator cartridges 1700', 1700", 1700'" can allow a suitable stack of conical springs to be used as appropriate. The vibration isolator cartridges 1700', 1700", 1700'" can be readily added, removed, and/or exchanged. In some arrangements, the bottom 1801 of the seat post 1800 can be removable and/or configured to allow access to the interior of the seat post 1800. As an example, there can be a nut or other closure element at the bottom 1801 of the seat post 1800 that can be unscrewed to permit access to the interior of the seat post 1800. Once removed, the vibration isolator cartridges can be removed or inserted into the seat post 1800.

FIG. 18A shows the vibration isolator cartridges 1700', 1700", 1700'" in a neutral or non-activated configuration. In the non-activated configuration, the distal ends 1780 of the shafts 1770 can be adjacent to, be slightly spaced a distance from, or be in contact with the respective head 1760 of a neighboring plunger 1750.

When a load is imposed upon the head 1760 of the plunger 1750' of the vibration isolator cartridge 1700', such as from the engaging structure 1850, the plunger 1750' can be moved downwardly. The distal end 1780 of the shaft 1770 of the plunger 1750' can come into contact with the head 1760 of the plunger 1750", or it may start to depress the head 1760 of the plunger 1750". The distal end 1780 of the shaft 1770 of the plunger 1750' can pass through the aperture 1730 in the lower end 1720 of the housing 1705 of the vibration isolator cartridge 1700'. As the plunger 1750' moves further downwardly, the head 1760 of the plunger 1750" will be moved downwardly. The distal end 1780 of the shaft 1770 of the plunger 1750" can come into contact with the head 1760 of the plunger 1750'", or it may start to depress the head 1760 of the plunger 1750'. As the plunger 1750" moves further downwardly, the head 1760 of the plunger 1750' will be moved downwardly. In some arrangements, the plungers 1750', 1750", 1750'" can de depressed simultaneously or substantially simultaneously.

Figure 18B:
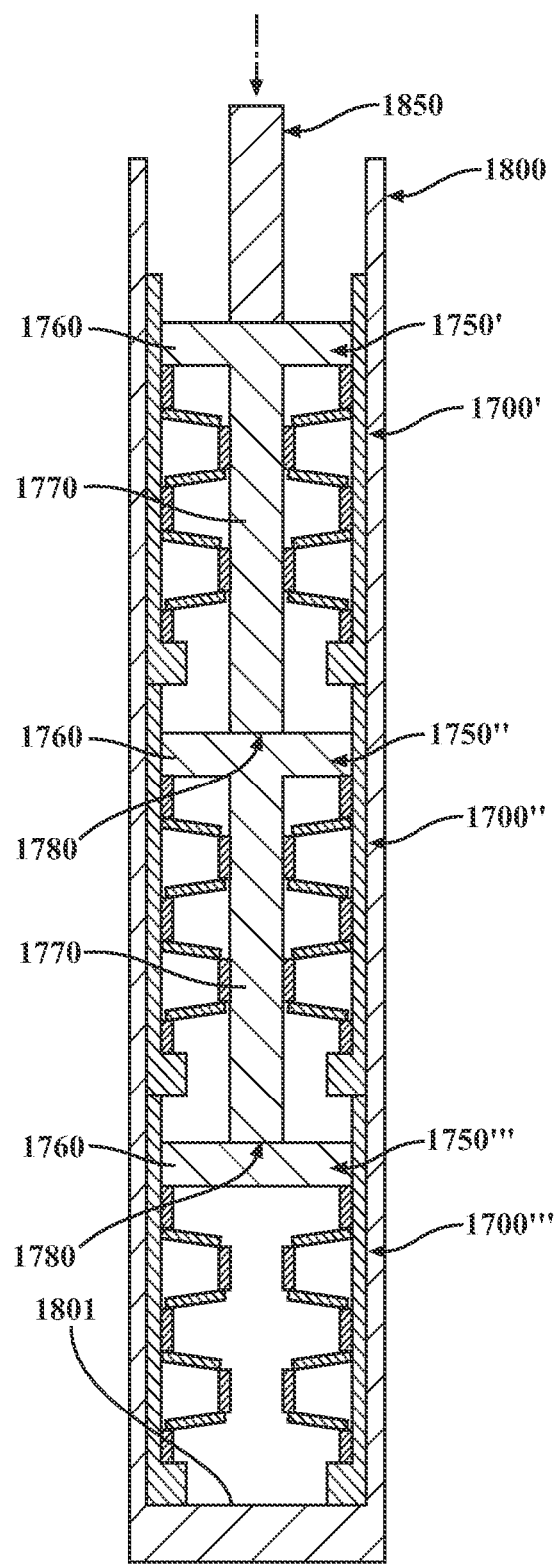
FIG. 18B is a cross-sectional view of a portion of a bicycle, showing the plurality of isolator cartridges is a compressed condition.

As a result, the stack of conical springs in each of the vibration isolator cartridges 1700', 1700", 1700' can be compressed. FIG. 18B shows an example of the compression of the stacks of conical springs. As the conical springs are compressed, the vibration isolator cartridges 1700', 1700", 1700'" can be in the different stiffness regions of the force-deflection curve, as will be explained in more detail below. In some arrangements, the stack of conical springs in each of the vibration isolator cartridges 1700', 1700", 1700'" can be compressed simultaneously or substantially simultaneously.

Figure 19:
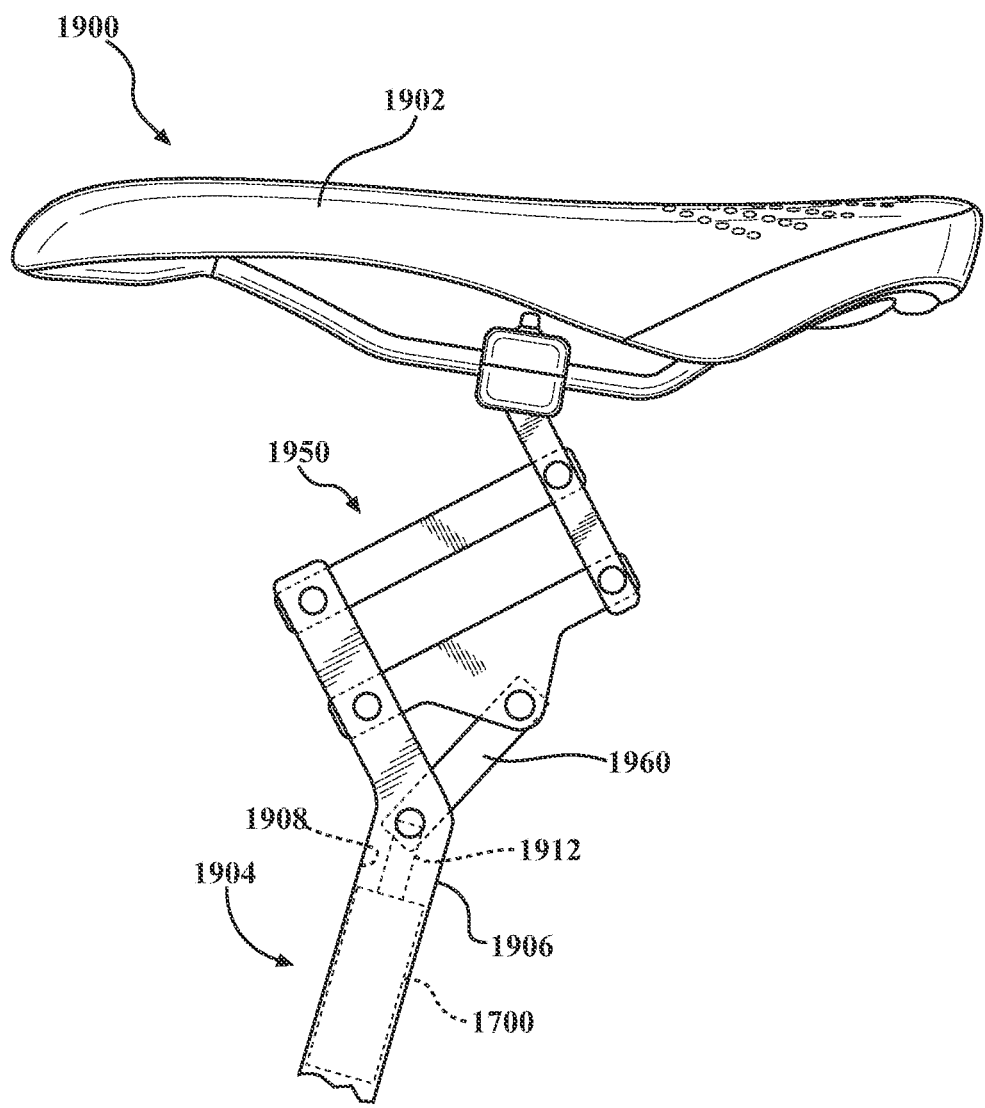
FIG. 19 is an example of a portion of a bicycle.

Referring to FIG. 19, an example of a portion of a bicycle 1900 is shown. While arrangements described herein will be made with respect to a bicycle, it will be understood that arrangements described herein can be used in connection with various devices that include a seat or saddle. For instance, arrangements described herein can be used in connection with any powered or non-powered vehicle, including, for example, a unicycle, a motorcycle, or a tricycle.

The bicycle 1900 can include a saddle 1902, which may also be referred to as a seat. The saddle 1902 can be designed to support a portion of a rider's body. The saddle 1902 can provide cushioning and/or comfort to a user. The saddle 1902 can be any type of saddle, now known or later developed.

The saddle 1902 can be operatively connected to a frame 1904 of the bicycle in any suitable manner, now known or later developed. In one or more arrangements, the saddle 1902 can be operatively connected to a seat post 1906 (which can be seat post 1800 in FIG. 18). The seat post 1906 can be a tubular structure. In some arrangements, at least a portion of the seat post 1906 can be hollow. In such case, the seat post 1906 can have an inner peripheral surface 1908.

A one or more vibration isolator cartridges 1700 can be operatively positioned to reduce vibrations acting upon the saddle 1902. The vibration isolator cartridge(s) 1700 can be provided in any suitable location. In one or more arrangements, the vibration isolator cartridge(s) 1700 can be located within the hollow interior of the seat post 1906. In some arrangements, the vibration isolator cartridge(s) 1700 are not connected to other structures within the seat post 1906. In some arrangements, the vibration isolator cartridge(s) 1700 can frictionally engage the inner peripheral surface 1908 of the seat post 1906. In some arrangements, the vibration isolator cartridge(s) 1700 can be operatively connected to the seat post 1906. For instance, the vibration isolator cartridge(s) 1700 can be operatively connected to the seat post 1906 by one or more fasteners, one or more welds, one or more adhesives, and/or one or more forms of mechanical engagement, or any combination thereof. The vibration isolator cartridge(s) 1700 can be operatively positioned with respect to an engaging structure, such as a pin 1912 of the saddle 1902 or other structure operatively connected to the saddle 1902. In some arrangements, the engaging structure can be moved to compress a plunger of an uppermost one of the vibration isolator cartridge(s) 1700. The engaging structure (e.g., pin 1912) can be moved by the four-bar linkage 1950 or a linkage 1960 operatively connected to the four-bar linkage 1950.

In some arrangements, the engaging structure (e.g., the pin 1912) can directly contact the plunger 1750 of the vibration isolator cartridge 1700. In some arrangements, the engaging structure (e.g., the pin 1912) can be spaced from the vibration isolator cartridge 1700.

In use, the structure above the pin 1912 in FIG. 19 (e.g., a four-bar linkage 1950 or other structure) can push downwardly on the pin 1912. As a result, the pin 1912 can push downwardly on the vibration isolator cartridge 1700. In some arrangements, the structure and the pin 1912 can be separate structures. In other arrangements, the structure and the pin 1912 can be operatively connected to each other or can be a unitary structure.

It should be noted that, while the arrangements shown in FIG. 19 depict a single vibration isolator cartridge 1700, it will be appreciated that there can be a plurality of vibration isolator cartridges 1700. In such case, the plurality of vibration isolator cartridges 1700 can be arranged in any suitable manner. For instance, the plurality of vibration isolator cartridges 1700 can be stacked end to end within the seat post 1906. When there is a plurality of vibration isolator cartridges 1700, the vibration isolator cartridges 1700 can be substantially identical to each other, or one or more of the vibration isolator cartridges 1700 can be different from the other vibration isolator cartridges 1700 in one or more respects.

Figure 20:
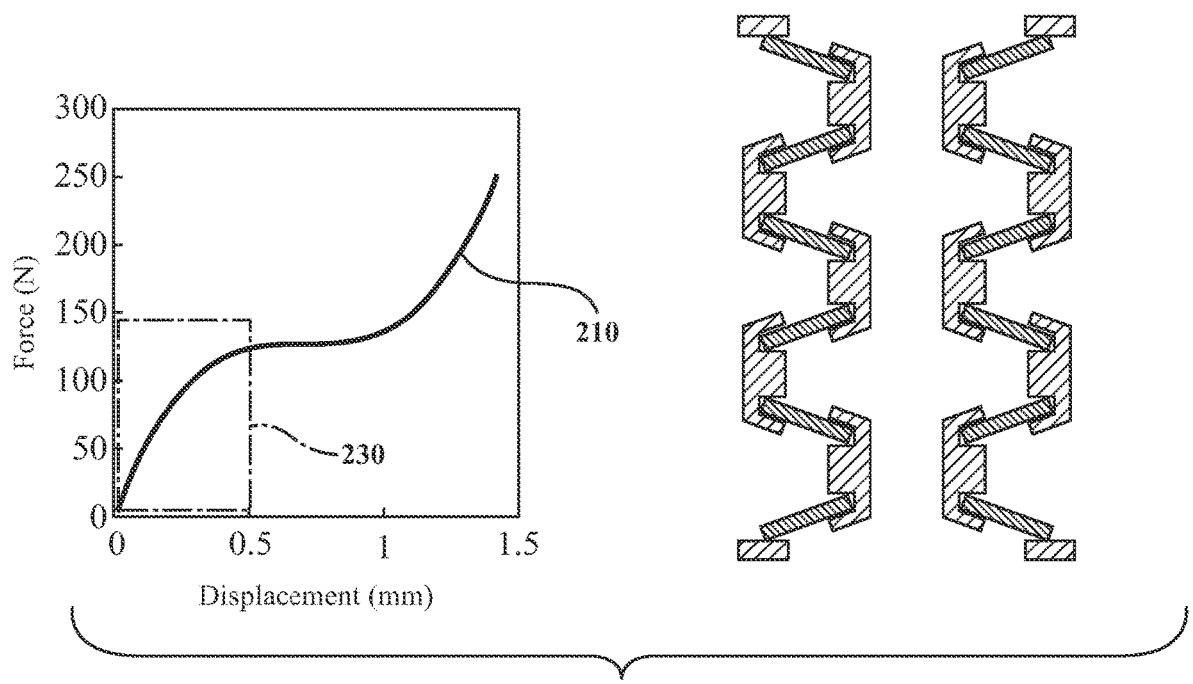
FIG. 20 shows the state of the stack of conical springs shown in FIG. 13 in an initial stiffness region of a force-displacement curve.
Figure 21:
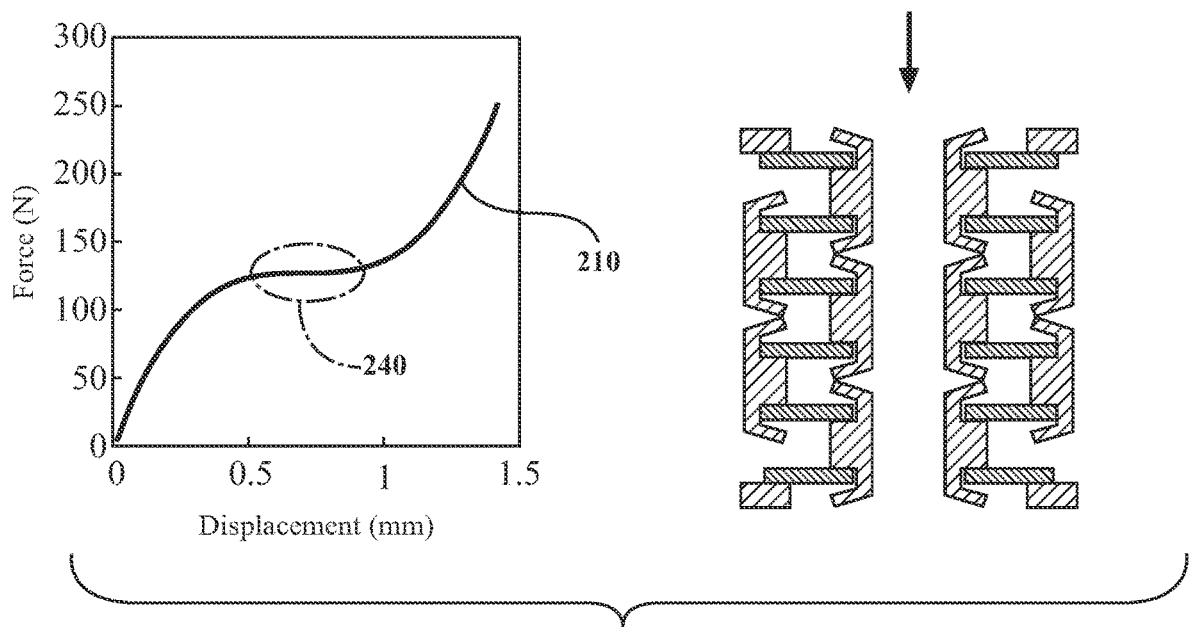
FIG. 21 shows the state of the stack of conical springs shown in FIG. 13 in a quasi-zero stiffness region of the force-displacement curve.
Figure 22:
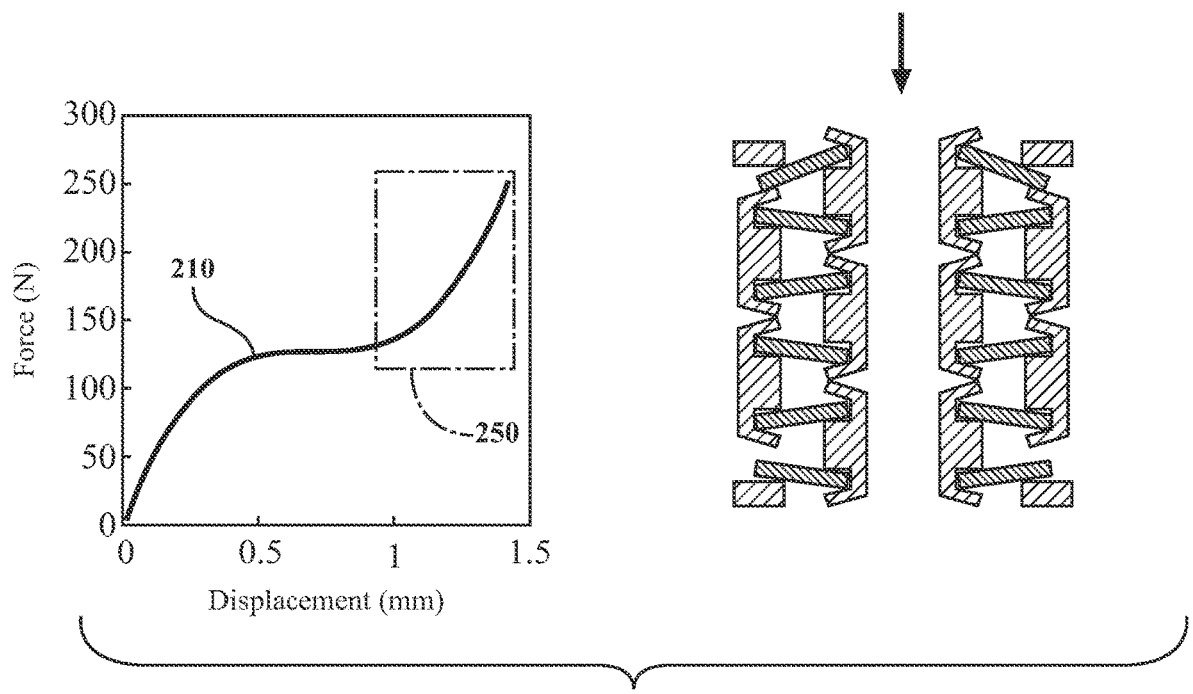
FIG. 22 shows the state of the stack of conical springs shown in FIG. 13 in a subsequent stiffness region of the force-displacement curve.

FIG. 20-22 show the state of the stack of conical springs of FIG. 16 in various regions of the force-displacement curve. It should be noted that the above discussion of FIGS. 2A-2B and FIG. 3 apply equally to these arrangements. FIG. 20 shows a representation of the stack of conical springs in the initial stiffness region 230 of the force-deflection curve 210. While the stack of conical springs from FIG. 16 is shown, it will be appreciated that this discussion can apply to any of the stack of conical springs described herein (including those shown in FIGS. 13-15, 17, and 18). As can be seen, the conical springs 300 can be substantially in their neutral condition. In the initial stiffness region 230, the stiffness curve is substantially linear, increasing from the origin of the graph. The stack of conical springs can be relatively stiff in the initial stiffness region 230.

In FIG. 21, the stack of conical springs is in the quasi-zero stiffness region 240 of the force-deflection curve 210. In the quasi-zero stiffness region 240, the force-deflection curve becomes substantially flat. The stiffness becomes very low-zero or substantially zero. The quasi-zero stiffness region 240 allows for good isolation. In the quasi-zero stiffness region 240, the conical springs 300 can become substantially flat from their initial shape.

In FIG. 22, the stack of conical springs can be in the subsequent stiffness region 250. In the subsequent stiffness region 250, the stiffness curve can be substantially linear, increasing from the end of the quasi-zero stiffness region 240. The stack of conical springs can be relatively stiff in the initial stiffness region 230. As can be seen, the conical springs 300 can become inverted relative to their initial shape. It will be appreciated that the configuration of the stack of conical springs allows such inversion to occur.

It will be appreciated that the characteristics of the quasi-zero stiffness region can be tuned to attain the desired performance characteristics. Such tuning can be achieved by changing the characteristics of the conical springs, the quantity of the conical springs, the arrangement of the conical springs, other components of the isolators, and/or other factors, just to name a few possibilities.

Figure 23A:
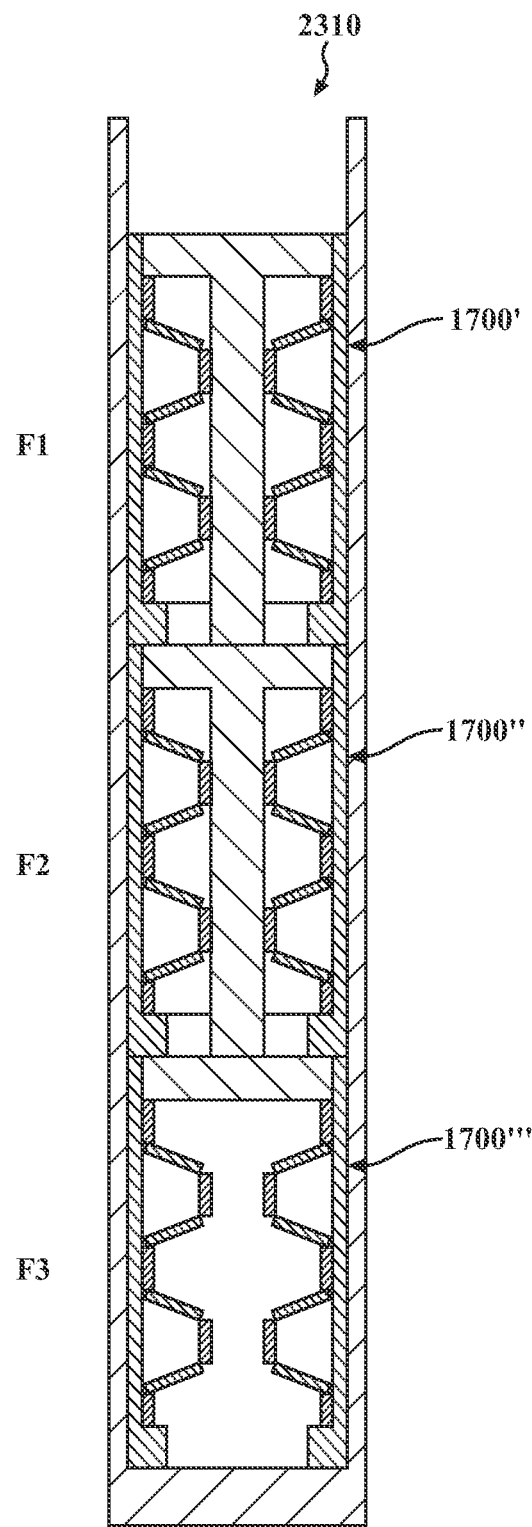
FIG. 23A shows an example of a stack of a three vibration isolator cartridges.

Also, it should be noted that any quantity of vibration isolation cartridges can be used. If the structure into which they are received is longer than the vibration isolation cartridges, then spacer cartridges can be used to fill the space. Referring to FIG. 23A, an example of a 3-cartridge configuration 2310 is shown. Each of the vibration isolator cartridges 1700', 1700", 1700"' can have an associated force F1, F2, F3, respectively. Since the vibration isolator cartridges 1700', 1700", 1700"' act in parallel, the total spring force is F=F1+F2+F3.

Figure 23B:
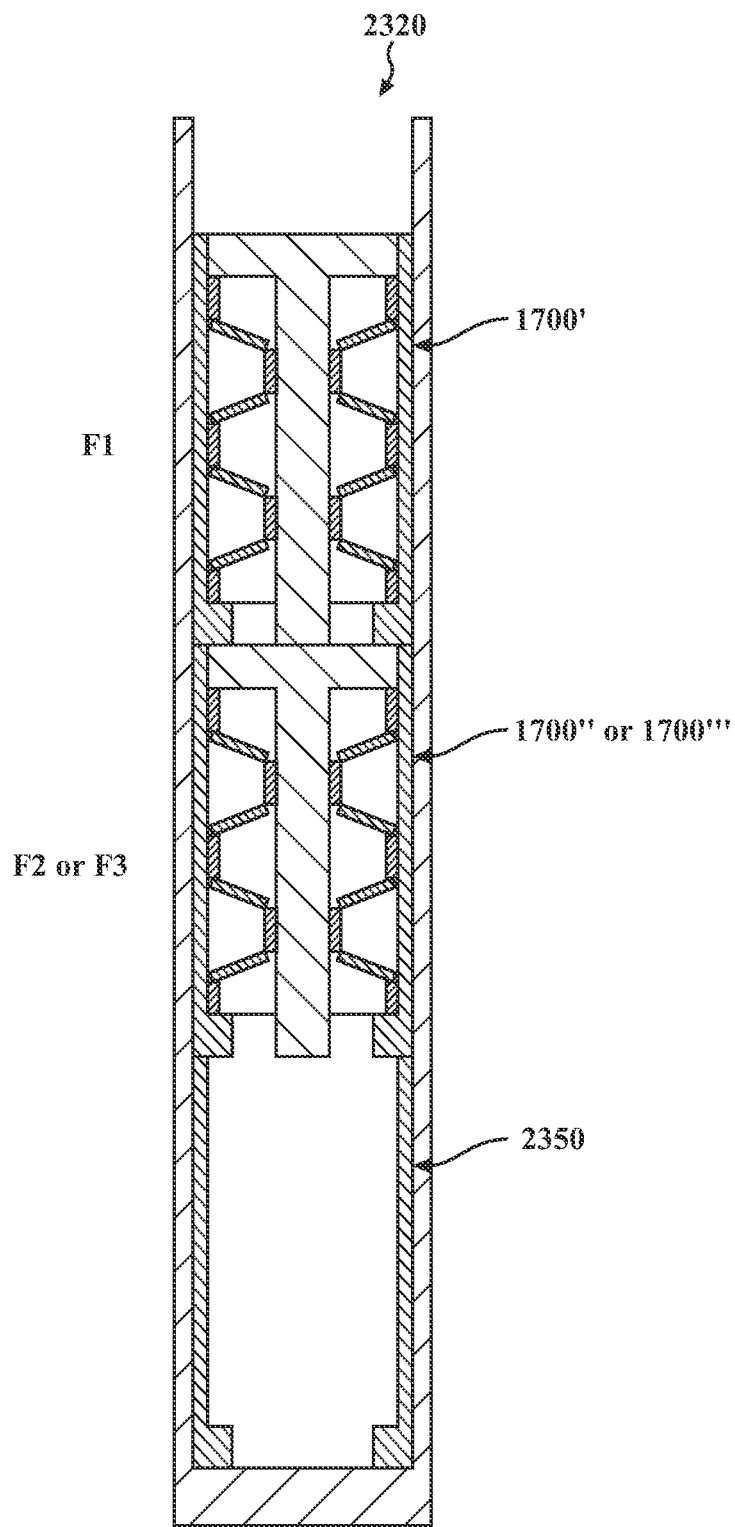
FIG. 23B shows an example of a stack of a two vibration isolator cartridges and a spacer.

In FIG. 23B, an example of 2-cartridge configuration 2320 is shown. Here there are two vibration isolator cartridges 1700' and 1700" or 1700' with associated forces F1 and F2 or F3. In the 2-cartridge configuration 2320, there can be a spacer 2350 to fill in the space within the structure into which the vibration isolator cartridges 1700 are received. The spacer 2350 can be an empty vibration isolator cartridge, such as just the housing 1705. The spacer 2350 can have substantially the same overall dimensions as the vibration isolator cartridges. Alternatively, the dimensions of spacer 2350 can be different from the dimensions of the vibration isolator cartridges in one or more respects, such as height. Since the vibration isolator cartridges 1700' and 1700" or 1700"' act in parallel, the total spring force can be either F=F1+F2 or F=F1+F3.

Figure 24:
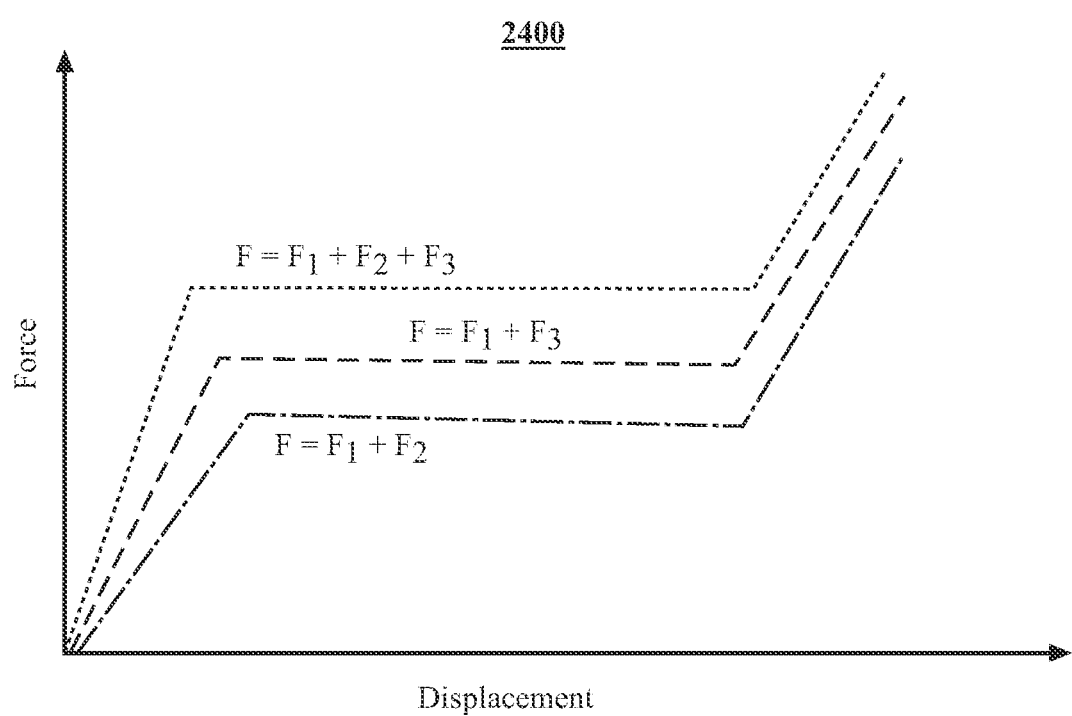
FIG. 24 shows an example of a force v. displacement graph, showing force-displacement curves for various stacks of a plurality of vibration isolator cartridges.

It will be appreciated that the modular design of the vibration isolator cartridges can enable flexibility in attaining desired vibration isolation performance characteristics. Indeed, the vibration isolator cartridges can be mixed and matched as needed to attain the desired characteristics. FIG. 24 shows an example of a force v. displacement graph 2400, showing force-displacement curves for various combinations of vibration isolator cartridges in FIGS. 23A-23B. As is evident, different combinations of vibration isolator cartridges can yield different curves on the force v. displacement graph. It will be appreciated that, though the vibration isolator cartridges are arranged in an end-to-end manner, the vibration isolator cartridges are configured to effectively act in parallel with each other to achieve the overall desired effect. Further, it will be appreciated that the compact arrangements described herein can allow a higher overall force to be achieved by the vibration isolator cartridges. It should be noted that the forces achieved by the arrangements described herein would not be attained with a single stack of conical springs. Such a stack would be limited by the diameter of the conical springs, as conical springs with sufficiently high forces do not come in small diameters. As a result, they could not be practically used in small diameter applications, such as in a bicycle seat post.

In some arrangements, a bicycle seat post can come pre-assembled with a plurality of vibration isolator cartridges inside. Thus, F1+F2+ . . . Fn can be the total isolation load or design weight. However, there may be some instances in which the circumstances may be outside of the design range. For instance, a bicycle rider may be heavier or lighter and falls outside of the design range. In such case, additional adjustment is offered by changing the vibration isolation cartridges used in the seat post based on the rider's weight. The vibration isolation cartridges can be easily added, removed, replaced, or rearranged to get good isolation or design weight for the rider.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC, or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A vibration isolator cartridge comprising:
    a housing including an inner wall;
    a plunger, the plunger being configured to be depressed toward a distal end portion of the housing, the plunger includes a head and a shaft; and
    a plurality of spring members operatively positioned within the housing between the plunger and the distal end portion of the housing, the plurality of spring members being arranged in a stack, the plurality of spring members being adjacent to the inner wall, whereby no intervening structure is located between the spring members and the inner wall, each of the plurality of spring members including a central aperture, the shaft extending through the central apertures of the spring members,
    the vibration isolator cartridge being configured to exhibit a non-linear stiffness profile, the non-linear stiffness profile including a region of quasi-zero stiffness.

2. The vibration isolator cartridge of claim 1, wherein the plurality of spring members is a plurality of conical springs.

3. The vibration isolator cartridge of claim 2, wherein the conical springs are arranged in an alternating pattern, wherein each conical spring includes an outer diameter body portion and an inner diameter body portion, and wherein, for at least some of the conical springs, at least one of:
    the outer diameter body portion faces the outer diameter body portion of a neighboring one of the conical springs; and
    the inner diameter body portion faces the inner diameter body portion of a neighboring one of the conical springs.

4. The vibration isolator cartridge of claim 3, wherein the outer diameter body portion and the outer diameter body portion of a neighboring one of the conical springs are separated by an outer spacer.

5. The vibration isolator cartridge of claim 4, wherein the outer spacer is a non-locking spacer.

6. The vibration isolator cartridge of claim 4, wherein the outer spacer does not increase an overall envelope of the plurality of conical springs in a lateral direction.

7. The vibration isolator cartridge of claim 4, wherein the inner wall of the housing keeps the plurality of conical springs substantially concentrically aligned.

8. The vibration isolator cartridge of claim 3, the inner diameter body portion and the inner diameter body portion of a neighboring one of the conical springs are separated by a spacer.

9. The vibration isolator cartridge of claim 3, wherein the outer diameter body portion of the conical springs are adjacent to the inner wall of the housing.

10. The vibration isolator cartridge of claim 2, wherein the conical springs are double stacked in an alternating pattern.

11. A vibration isolation system comprising:
    a plurality of vibration isolator cartridges arranged in an end-to-end manner, each of the plurality of vibration isolator cartridges including:
        a housing; and
        a plurality of conical springs operatively positioned within the housing, the plurality of conical springs being arranged in a stack,
    each of the plurality of vibration isolator cartridges being configured to exhibit a non-linear stiffness profile, the non-linear stiffness profile including a region of quasi-zero stiffness, the plurality of vibration isolator cartridges being configured to act in parallel with each other.

12. The vibration isolation system of claim 11, wherein at least one of the vibration isolator cartridges has a different vibration isolation performance than the rest of the plurality of vibration isolator cartridges.

13. The vibration isolation system of claim 11, wherein, in at least one of the plurality of vibration isolator cartridges, neighboring conical springs in the stack of conical spring are separated by a spacer.

14. The vibration isolation system of claim 11, wherein an inner wall of the housing keeps the plurality of conical springs substantially concentrically aligned.

15. The vibration isolation system of claim 11, wherein, in at least one of the plurality of vibration isolator cartridges, the conical springs are double stacked in an alternating pattern.

16. The vibration isolation system of claim 11, wherein each vibration isolator cartridge further includes a plunger, and wherein the plunger is configured to be depressed toward a distal end portion of the housing, whereby the plurality of conical springs is compressed when the plunger is depressed.

17. The vibration isolation system of claim 11, wherein, for each of the plurality of vibration isolator cartridges, the stack of spring members is configured to be in a quasi-zero stiffness region of the non-linear stiffness profile when compressed.

18. A system for vibration isolation of a bicycle saddle, the system comprising:
  a bicycle saddle;
  a bicycle frame, the bicycle saddle being operatively connected to the bicycle frame; and
  a plurality of vibration isolator cartridges located within a portion of the bicycle frame, the plurality of vibration isolator cartridges being operatively positioned with respect to the bicycle saddle, each of the vibration isolator cartridges including a plurality of conical springs arranged in a stack, each of the plurality of vibration isolator cartridges being configured to exhibit a non-linear stiffness profile, the non-linear stiffness profile including a region of quasi-zero stiffness.

19. The system of claim 18, wherein the bicycle frame includes a seat post, wherein the plurality of vibration isolator cartridges is received in the seat post, and wherein the plurality of vibration isolator cartridges are arranged in an end-to-end manner.

20. The system of claim 19, wherein the plurality of vibration isolator cartridges is configured to act in parallel with each other.

* * * * *

UNITED STATES PATENT AND TRADEMARK OFFICE
CERTIFICATE OF CORRECTION

PATENT NO. : 11,827,299 B2
APPLICATION NO. : 18/161611
DATED : November 28, 2023
INVENTOR(S) : Paul A. Gilmore et al.

It is certified that error appears in the above-identified patent and that said Letters Patent is hereby corrected as shown below:

On the Title Page

In item (73) the Assignee field: delete "Toyota Motor Engineering & Manufacturing North America, inc.," and insert --Toyota Motor Engineering & Manufacturing North America, Inc.,--

In the Specification

Column 8, Line 22: delete "very low-zero or substantially zero." and insert --very low – zero or substantially zero.--

Column 21, Line 20: delete "1700:."." and insert -- 1700'''.--

Column 21, Line 22: delete "1700', 1700", 1700'''" and insert --1700', 1700", 1700'''--

Column 21, Line 23: delete "1750', 1750", 1750'''" and insert --1750', 1750", 1750'''--

Column 21, Line 26: "1750', 1750", 1750'''" and insert --1750', 1750", 1750'''--

Column 21, Line 33: delete "1750''" and insert --1750'''--

Column 22, Line 40: delete "1750'." and insert --1750'''.--

Column 22, Line 41: delete "1750'" and insert --1750'''--

Column 22, Line 43: delete "can de depressed" and insert --can be depressed--

Column 22, Line 46: delete "1700', 1700", 1700'''" and insert --1700', 1700", 1700'''--

Column 24, Lines 15-16: delete "very low-zero or substantially zero." and insert --very low – zero or substantially zero.--

Signed and Sealed this
Twelfth Day of August, 2025

Coke Morgan Stewart
*Acting Director of the United States Patent and Trademark Office*

Column 24, Line 42: delete "1700', 1700", 1700""" and insert --1700', 1700", 1700'"--

Column 24, Line 44: delete "1700', 1700", 1700""" and insert --1700', 1700", 1700'"--

Column 24, Lines 46: delete "an example of 2-cartridge configuration" and insert --an example of a 2-cartridge configuration--

Column 24, Line 48: delete "1700' and 1700" or 1700'" and insert --1700' and 1700" or 1700'"--

Column 24, Lines 58-59: delete "1700' and 1700" or 1700""" and insert --1700' and 1700" or 1700'"--